United States Patent
Oumi et al.

(10) Patent No.: US 11,428,429 B2
(45) Date of Patent: Aug. 30, 2022

(54) SYSTEMS AND METHODS FOR ADJUSTING COMMUNICATION CONDITION OF AN AIR CONDITIONER

(71) Applicant: DAIKIN INDUSTRIES, LTD., Osaka (JP)

(72) Inventors: Naoko Oumi, Osaka (JP); Hidehiko Hashimoto, Osaka (JP); Yuuki Murakami, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 160 days.

(21) Appl. No.: 16/337,901

(22) PCT Filed: Sep. 29, 2017

(86) PCT No.: PCT/JP2017/035742
§ 371 (c)(1),
(2) Date: Mar. 28, 2019

(87) PCT Pub. No.: WO2018/062555
PCT Pub. Date: Apr. 5, 2018

(65) Prior Publication Data
US 2020/0025403 A1    Jan. 23, 2020

(30) Foreign Application Priority Data

Sep. 30, 2016  (JP) .............................. JP2016-194489

(51) Int. Cl.
*F24F 11/65* (2018.01)
*F24F 11/49* (2018.01)
(Continued)

(52) U.S. Cl.
CPC .............. *F24F 11/49* (2018.01); *F24F 11/57* (2018.01); *F24F 11/58* (2018.01); *F24F 11/64* (2018.01);
(Continued)

(58) Field of Classification Search
None
See application file for complete search history.

(56) References Cited

U.S. PATENT DOCUMENTS

| | | | |
|---|---|---|---|
| 7,523,872 B2 | 4/2009 | Masui et al. | |
| 2004/0044502 A1* | 3/2004 | Ito | F24F 11/30 702/188 |

(Continued)

FOREIGN PATENT DOCUMENTS

| | | |
|---|---|---|
| EP | 1 956 314 A2 | 8/2008 |
| EP | 2 219 384 A1 | 8/2010 |

(Continued)

OTHER PUBLICATIONS

International Preliminary Report of corresponding PCT Application No. PCT/JP2017/035742 dated Apr. 11, 2019.

(Continued)

*Primary Examiner* — Bernard G Lindsay
(74) *Attorney, Agent, or Firm* — Global IP Counselors, LLP

(57) ABSTRACT

An equipment management system includes an information processing apparatus obtains equipment information about equipment, and a management apparatus. The management apparatus communicates the equipment information with the information processing apparatus under a predetermined communication condition, and manages the equipment. Either or both of the management apparatus and the information processing apparatus include a candidate communication condition generating unit that generates one or more candidate communication conditions in accordance with one or both of a state of the equipment and a state of an installation space in which the equipment is installed.

16 Claims, 21 Drawing Sheets

(51) Int. Cl.
*F24F 11/57* (2018.01)
*F24F 11/64* (2018.01)
*F24F 11/58* (2018.01)
*G05B 15/02* (2006.01)
*F24F 140/00* (2018.01)
*F24F 140/50* (2018.01)

(52) U.S. Cl.
CPC .............. *F24F 11/65* (2018.01); *G05B 15/02* (2013.01); *F24F 2140/00* (2018.01); *F24F 2140/50* (2018.01)

(56) References Cited

U.S. PATENT DOCUMENTS

| | | | |
|---|---|---|---|
| 2004/0078670 | A1 | 4/2004 | Mizumaki |
| 2010/0250453 | A1* | 9/2010 | Kawai ...................... H04Q 9/00 705/305 |
| 2010/0250724 | A1* | 9/2010 | Kawai ...................... F24F 11/62 709/223 |
| 2012/0042066 | A1* | 2/2012 | Chatterjee ........... H04L 41/0816 709/224 |
| 2015/0100167 | A1* | 4/2015 | Sloo ........................ G08B 29/02 700/278 |
| 2015/0316281 | A1* | 11/2015 | Yabuta ................... G05B 15/02 700/276 |
| 2015/0327021 | A1* | 11/2015 | Ralston ................. H04W 28/06 455/456.3 |
| 2015/0373482 | A1* | 12/2015 | Barnard ................... G08G 1/14 370/338 |
| 2016/0182704 | A1 | 6/2016 | Minezawa et al. |
| 2017/0123440 | A1* | 5/2017 | Mangsuli ................. F24F 11/62 |
| 2017/0192400 | A1* | 7/2017 | Hofschulz ............... H04W 4/70 |
| 2017/0214735 | A1* | 7/2017 | Sunata ................ H04L 43/0811 |
| 2017/0244575 | A1* | 8/2017 | Yamane ................ H04L 67/125 |

FOREIGN PATENT DOCUMENTS

| | | |
|---|---|---|
| JP | 2002-374584 A | 12/2002 |
| JP | 2003-161495 A | 6/2003 |
| JP | 2006-54832 A | 2/2006 |
| JP | 4149240 B2 | 7/2008 |
| JP | 2010-7947 A | 1/2010 |
| JP | 2011-193218 A | 9/2011 |
| JP | 2012-141110 A | 7/2012 |
| JP | 2013-204845 A | 10/2013 |

OTHER PUBLICATIONS

European Search Report of corresponding EP Application No. 17 85 6502.4 dated May 13, 2020.

International Search Report of corresponding PCT Application No. PCT/JP2017/035742 dated Jan. 9, 2018.

\* cited by examiner

| INDOOR UNIT ID = xxx1 INSTALLATION SPACE = ROOM A ||
|---|---|
| TIME SLOT | PRESENCE INFORMATION |
| 0:00-0:59 | ABSENT |
| 01:00-01:59 | ABSENT |
| 02:00-02:59 | ABSENT |
| 03:00-03:59 | ABSENT |
| 04:00-04:59 | ABSENT |
| 05:00-05:59 | ABSENT |
| 06:00-06:59 | ABSENT |
| 07:00-07:59 | ABSENT |
| 08:00-08:59 | PRESENT |
| 09:00-09:59 | PRESENT |
| 10:00-10:59 | PRESENT |
| 11:00-11:59 | PRESENT |
| 12:00-12:59 | INTERMEDIATE |
| 13:00-13:59 | PRESENT |
| 14:00-14:59 | PRESENT |
| 15:00-15:59 | PRESENT |
| 16:00-16:59 | PRESENT |
| 17:00-17:59 | PRESENT |
| 18:00-18:59 | PRESENT |
| 19:00-19:59 | PRESENT |
| 20:00-20:59 | PRESENT |
| 21:00-21:59 | PRESENT |
| 22:00-22:59 | ABSENT |
| 23:00-23:59 | ABSENT |

FIG. 6

SYSTEMS AND METHODS FOR ADJUSTING COMMUNICATION CONDITION OF AN AIR CONDITIONER

CROSS-REFERENCE TO RELATED APPLICATIONS

This U.S. National stage application claims priority under 35 U.S.C. § 119(a) to Japanese Patent Application No. 2016-194489, filed in Japan on Sep. 30, 2016, the entire contents of which are hereby incorporated herein by reference.

TECHNICAL FIELD

The present invention relates to an equipment management system, an air conditioner management system, and a communication condition adjustment method.

BACKGROUND ART

Hitherto, an air conditioner management service has been provided in which a management apparatus installed in a management center intensively manages air conditioners (pieces of equipment) in buildings located in various places (for example, Japanese Patent No. 4149240).

SUMMARY

A plurality of items of air conditioner information (equipment information) are communicated between each air conditioner (each piece of equipment) and the management apparatus. However, when the communication frequency increases, the amount of communication becomes enormous, resulting in an increase in communication load and communication charges. On the other hand, when the communication frequency decreases, it becomes difficult to provide an appropriate management service for the air conditioners.

An object of the present invention is to provide an equipment management system, an air conditioner management system, and a communication condition adjustment method that enable appropriate management of equipment while decreasing a communication load.

An equipment management system according to a first aspect of the present invention includes an information processing apparatus and a management apparatus. The information processing apparatus obtains equipment information about equipment. The management apparatus communicates the equipment information with the information processing apparatus under a predetermined communication condition and manages the equipment. Either or both of the management apparatus and the information processing apparatus include a candidate communication condition generating unit that generates one or more candidate communication conditions in accordance with a state of the equipment and/or a state of an installation space in which the equipment is installed.

In the equipment management system according to the first aspect, the above configuration enables a more preferable communication condition to be selected, and thus the equipment can be appropriately managed with a reduced communication load.

An equipment management system according to a second aspect of the present invention is the equipment management system according to the first aspect, wherein either or both of the management apparatus and the information processing apparatus include a communication condition adjusting unit that decides on one communication condition from among the one or more candidate communication conditions generated by the candidate communication condition generating unit and adjusts a condition of communication between the information processing apparatus and the management apparatus.

In the equipment management system according to the second aspect, a communication condition is adjusted to be optimized in accordance with the state of the equipment and/or the state of the installation space in which the equipment is installed, and thus the equipment can be appropriately managed with a reduced communication load.

An equipment management system according to a third aspect of the present invention is the equipment management system according to the first aspect or the second aspect, wherein the equipment information includes state information indicating the state of the equipment and instruction information for changing the state of the equipment.

In the equipment management system according to the third aspect, the amount of communication of the state information can be reduced in a time slot in which the equipment is not operating. On the other hand, the amount of communication of the instruction information can be maintained in a time slot in which the equipment is not operating.

An equipment management system according to a fourth aspect of the present invention is the equipment management system according to the first aspect to the third aspect, wherein the state of the installation space is determined by any of or an arbitrary combination of a type of the installation space, an installation position of the equipment in the installation space, a state of the constituent constituting the installation space, and a time slot in which communication is performed.

In the equipment management system according to the fourth aspect, the equipment is managed while being classified in a detailed manner in accordance with a combination of the foregoing pieces of information, and thus the communication condition of the entire system can be optimized.

An equipment management system according to a fifth aspect of the present invention is the equipment management system according to the first aspect to the fourth aspect, wherein the information processing apparatus includes a control apparatus and an intermediate processing apparatus. The control apparatus is disposed in the equipment. The intermediate processing apparatus is connected to the control apparatus and the management apparatus.

In the equipment management system according to the fifth aspect, the intermediate processing apparatus serves as an intermediary between the control apparatus and the management apparatus on a network, and thus the degree of freedom in system design can be increased.

An equipment management system according to a sixth aspect of the present invention is the equipment management system according to the fifth aspect, wherein the intermediate processing apparatus includes a state information obtaining unit and a change estimating unit. The state information obtaining unit obtains state information indicating the state of the equipment. The change estimating unit simulates a change in the state information. The equipment management system compares the state information obtained by the state information obtaining unit with state information simulated by the change estimating unit, and suppresses communication of the state information indicating the state of the equipment when the state information obtained by the state information obtaining unit does not have an abnormality.

In the equipment management system according to the sixth aspect, the above configuration enables the amount of communication between the intermediate processing apparatus and the management apparatus to be reduced.

An equipment management system according to a seventh aspect of the present invention is the equipment management system according to the first aspect to the sixth aspect, wherein the equipment is an air conditioner.

In the equipment management system according to the seventh aspect, the air conditioner can be appropriately managed with a reduced communication load.

An equipment management system according to an eighth aspect of the present invention is the equipment management system according to the seventh aspect, wherein the air conditioner includes an outdoor unit and one or a plurality of indoor units connected to the outdoor unit. The candidate communication condition generating unit generates the one or more candidate communication conditions on the basis of information on a person who is present in an installation space of the one or plurality of indoor units.

In the equipment management system according to the eighth aspect, the above configuration enables a communication condition to be changed to a communication condition that can optimize the amount of communication.

An equipment management system according to a ninth aspect of the present invention is the equipment management system according to the seventh aspect or the eighth aspect, wherein the air conditioner includes an outdoor unit and one or a plurality of indoor units connected to the outdoor unit. The candidate communication condition generating unit generates the one or more candidate communication conditions on the basis of information on an object that is disposed in an installation space of the one or plurality of indoor units.

In the equipment management system according to the ninth aspect, the above configuration enables a communication condition to be changed to a communication condition that can optimize the amount of communication.

An equipment management system according to a tenth aspect of the present invention is the equipment management system according to any of the first aspect to the ninth aspect, wherein the equipment information includes a plurality of items. The candidate communication condition generating unit generates, as the one or more candidate communication conditions, a communication condition determined by any of or an arbitrary combination of a number of items of the equipment information, a data length of the equipment information, and a communication interval of the equipment information.

In the equipment management system according to the tenth aspect, the above configuration enables a communication condition to be changed to a communication condition that can optimize the amount of communication.

An equipment management system according to an eleventh aspect of the present invention is the equipment management system according to any of the first aspect to the tenth aspect, wherein the candidate communication condition generating unit generates the one or more candidate communication conditions in association with an amount of communication and a communication path.

In the equipment management system according to the eleventh aspect, the above configuration enables a selection of a communication condition that optimizes the amount of communication and the communication path.

An equipment management system according to a twelfth aspect of the present invention is the equipment management system according to any of the first aspect to the eleventh aspect, wherein the candidate communication condition generating unit extracts, as the one or more candidate communication conditions, a communication path available at low communication charges from among communication paths satisfying a predetermined quality standard.

In the equipment management system according to the twelfth aspect, communication charges can be reduced with the quality standard being satisfied, and thus the introduction of the equipment management system can be promoted.

An air conditioner management system according to a thirteenth aspect of the present invention includes a control apparatus and a management apparatus. The control apparatus communicates air conditioner information about an air conditioner at a predetermined communication interval. The management apparatus communicates the air conditioner information with the control apparatus and manages the air conditioner. The management apparatus or the control apparatus includes a communication interval setting unit that changes a setting of the communication interval on the basis of presence information about presence of a person in an installation space of the air conditioner.

In the air conditioner management system according to the thirteenth aspect, the management apparatus or the control apparatus changes, on the basis of the presence information about presence of a person in an installation space of the air conditioner, the predetermined communication interval at which the air conditioner information is communicated. Thus, it is possible to provide the air conditioner management system capable of appropriately managing the air conditioner with a reduced communication load.

A communication condition adjustment method according to a fourteenth aspect of the present invention is used in an equipment management system including an information processing apparatus that obtains equipment information about equipment and a management apparatus that communicates the equipment information with the information processing apparatus under a predetermined communication condition and manages the equipment. The communication condition adjustment method includes adjusting the communication condition in accordance with a change in a state of the equipment and/or a state of an installation space of the equipment.

In the communication condition adjustment method according to the fourteenth aspect, a communication condition is adjusted in accordance with a change in the state of the equipment and/or the state of the installation space of the equipment, and thus the equipment can be appropriately managed with a reduced communication load.

A communication condition adjustment method according to a fifteenth aspect of the present invention is the communication condition adjustment method according to the fourteenth aspect, including changing a communication path in accordance with a change in an amount of communication caused by adjustment of the communication condition.

In the communication condition adjustment method according to the fifteenth aspect, a communication path is changed in accordance with a change in the amount of communication caused by adjustment of the communication condition, and thus a communication condition that optimizes the amount of communication and the communication path can be selected.

A communication condition adjustment method according to a sixteenth aspect of the present invention is the communication condition adjustment method according to the fourteenth aspect or the fifteenth aspect, including, in accordance with a change in an amount of communication caused by adjustment of the communication condition, changing a communication scheme to a communication scheme of long-range wireless communication including at least any of a third-generation mobile communication system (3G), a fourth-generation mobile communication system (4G), a fifth-generation mobile communication system (5G), and Low Power Wide Area (LPWA).

In the communication condition adjustment method according to the sixteenth aspect, a communication path is changed to an optimum communication path among the foregoing communication schemes of long-range wireless communication, in accordance with a change in the amount of communication caused by adjustment of the communication condition.

A communication condition adjustment method according to a seventeenth aspect of the present invention is the communication condition adjustment method according to the sixteenth aspect, wherein in the long-range wireless communication, different pay-per-use settings are applied to individual communication schemes.

In the communication condition adjustment method according to the seventeenth aspect, a communication condition that optimizes the communication charges can be selected from among the foregoing communication schemes of long-range wireless communication.

In the equipment management system according to the first aspect, the equipment can be appropriately managed with a reduced communication load.

In the equipment management system according to the second aspect, a communication condition can be adjusted to be optimized in accordance with the state of the equipment and/or the state of the installation space in which the equipment is installed.

In the equipment management system according to the third aspect, the amount of communication of the state information can be reduced in a time slot in which the equipment is not operating. On the other hand, the amount of communication of the instruction information can be maintained in a time slot in which the equipment is not operating.

In the equipment management system according to the fourth aspect, the communication condition of the entire system can be optimized.

In the equipment management system according to the fifth aspect, the degree of freedom in system design can be increased.

In the equipment management system according to the sixth aspect, the amount of communication between the intermediate processing apparatus and the management apparatus can be reduced.

In the equipment management system according to the seventh aspect, the air conditioner can be appropriately managed with a reduced communication load.

In the equipment management system according to the eighth to tenth aspects, a communication condition can be changed to a communication condition that can optimize the amount of communication.

In the equipment management system according to the eleventh aspect, a communication condition that optimizes the amount of communication and the communication path can be selected.

In the equipment management system according to the twelfth aspect, communication charges can be reduced with the quality standard being satisfied.

In the air conditioner management system according to the thirteenth aspect, it is possible to provide the air conditioner management system capable of appropriately managing the air conditioner with a reduced communication load.

In the communication condition adjustment method according to the fourteenth aspect, the equipment can be appropriately managed with a reduced communication load.

In the communication condition adjustment method according to the fifteenth aspect, a communication condition that optimizes the amount of communication and the communication path can be selected.

In the communication condition adjustment method according to the sixteenth aspect, a communication path can be changed to an optimum communication path among communication schemes of long-range wireless communication.

In the communication condition adjustment method according to the seventeenth aspect, a communication condition that optimizes the communication charges can be selected from among communication schemes of long-range wireless communication.

BRIEF DESCRIPTION OF THE DRAWINGS

FIG. 6 is a schematic diagram illustrating an example of presence information according to the first embodiment.

DETAILED DESCRIPTION OF EMBODIMENT(S)

First Embodiment

(1) Overall Configuration of Air Conditioner Management System 1

Figure 1:
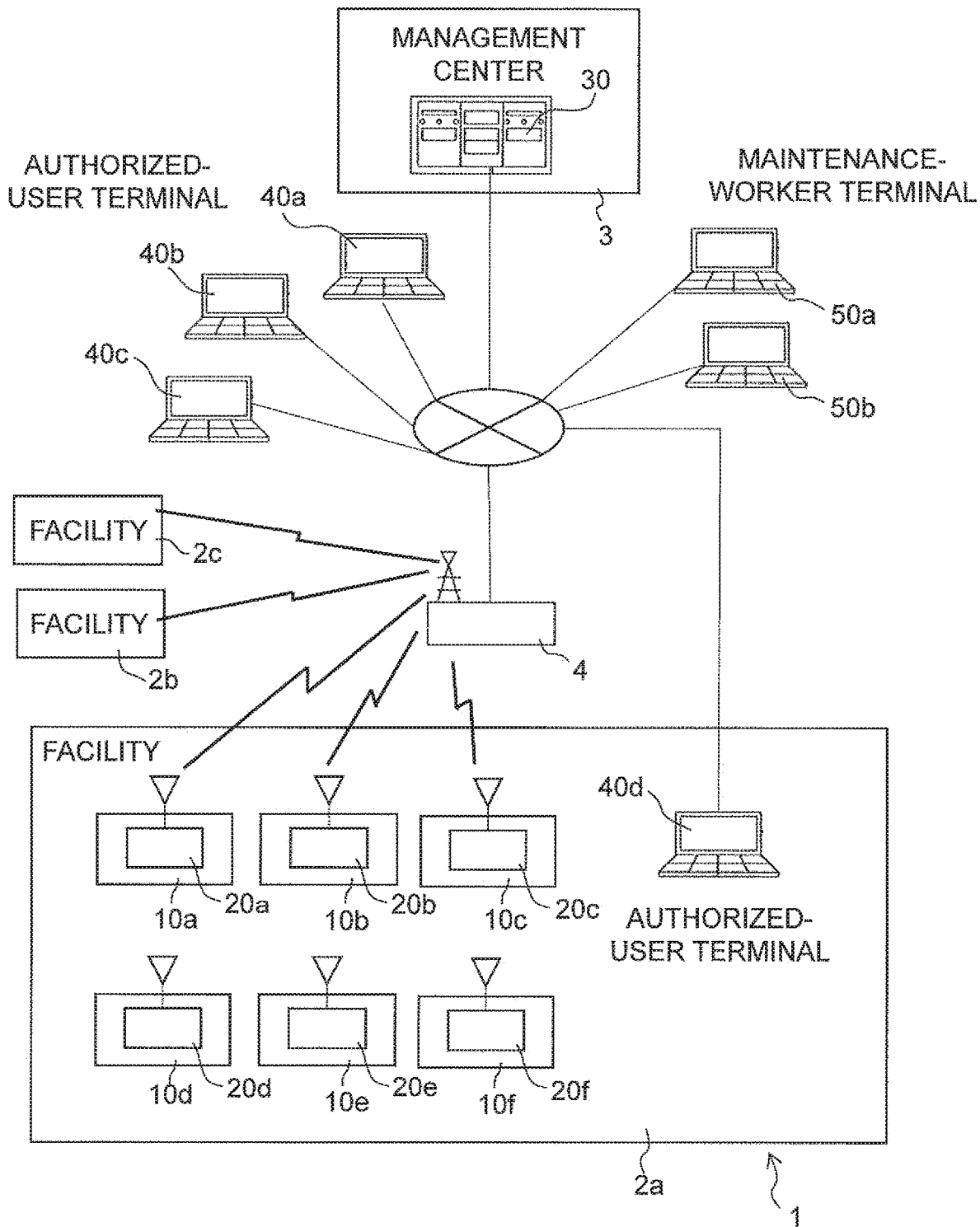
FIG. 1 is a schematic diagram of an air conditioner management system 1 according to a first embodiment of the present invention.

FIG. 1 is a schematic diagram illustrating the configuration of an air conditioner management system 1 according to a first embodiment of the present invention. In the following description, a plurality of apparatuses having similar functions are denoted by the same reference numerals when a common description is given about the apparatuses. When one of a plurality of apparatuses having similar functions is described as distinguished from the others, a lower-case alphabetic letter is attached to the reference numeral denoting the apparatus. Accordingly, for example, a plurality of air conditioners 10a to 10f, which are apparatuses having similar functions, are referred to as air conditioners 10 when a common description is given about them. Although the letters "a" to "f" and the like are attached to reference numerals for convenience, these letters represent an arbitrary number and the number is not limited thereto.

The air conditioner management system 1 is a system in which a single management apparatus 30 manages many air conditioners 10a to 10f. Here, the management apparatus 30 is installed in a central management center 3. There are many facilities 2a to 2c in a jurisdiction area of the central management center 3. The facilities 2a to 2c are, for example, an office building, a commercial building, and a condominium. One or a plurality of air conditioners 10a to 10f are installed in each of the facilities 2a to 2c. Control apparatuses 20a to 20f are mounted in the air conditioners 10a to 10f, respectively. Each of the control apparatuses 20a to 20f and the management apparatus 30 communicate air conditioner information which will be described below, so that the many air conditioners 10a to 10f are managed.

The management apparatus 30 and each of the control apparatuses 20a to 20f wirelessly communicate with each other via a communication base station 4. The communication between the management apparatus 30 and each of the control apparatuses 20a to 20f is executed by using the communication protocol of HTTP/1.1. The management apparatus 30 connects to a plurality of authorized-user terminals 40a to 40d and a plurality of maintenance-worker terminals 50a and 50b through a network.

(2) Detailed Configuration of Air Conditioner Management System 1

(2-1) Air Conditioner

Figure 2:
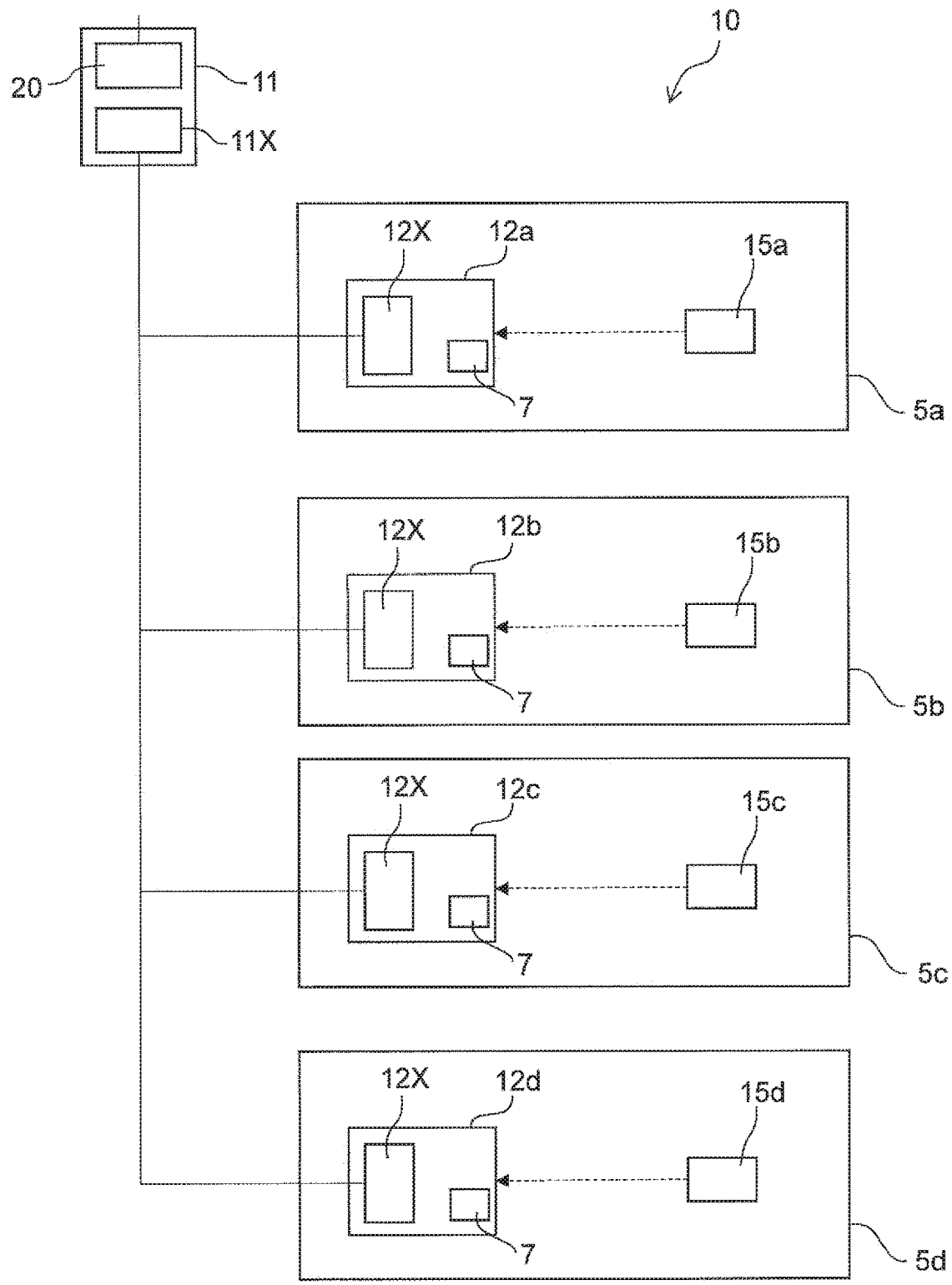
FIG. 2 is a schematic diagram illustrating the configuration of an air conditioner 10 according to the first embodiment.

FIG. 2 is a schematic diagram illustrating the configuration of the air conditioner 10 according to the first embodiment. The air conditioner 10 is a target to be managed by the air conditioner management system 1 and includes a refrigerant circuit constituted by a compressor, a heat exchanger, and the like which are not illustrated. The air conditioner 10 also includes an outdoor unit 11 and a plurality of indoor units 12a to 12d connected to the outdoor unit 11 through dedicated communication lines. The outdoor unit 11 includes an outdoor unit control circuit 11X. Each of the indoor units 12a to 12d includes an indoor unit control circuit 12X. In addition, the air conditioner 10 is appropriately attached with various sensors at predetermined positions. These sensors detect a room temperature, an ambient outside temperature, a discharge temperature and discharge pressure of refrigerant, and so forth. On the basis of detected values of the various sensors, the outdoor unit control circuit 11X and the indoor unit control circuits 12X cooperate with each other to control the operations of individual parts of the air conditioner 10. The air conditioner 10 is operated on the basis of instruction information received from an operation terminal 15, such as a remote controller and/or an operation panel, and instruction information received from the external authorized-user terminal 40 through the network.

The outdoor unit 11 is an apparatus that functions as a heat source of the refrigerant circuit. In the outdoor unit 11, the control apparatus 20 which will be described below is mounted. The outdoor unit 11 is installed outside a building of the facility 2, for example, on the roof of the building. The plurality of indoor units 12 are installed on a plurality of floors or in a plurality of rooms of the building of the facility 2 in a dispersed manner.

Each indoor unit 12 connects to the outdoor unit 11 through a dedicated communication line. The indoor unit 12 is operated by the operation terminal 15 installed indoors. The operation terminal 15 is constituted by, for example, a remote controller and an operation panel or the like attached indoors. Here, the plurality of indoor units 12a to 12d connected to the single outdoor unit 11 are operated while individually being associated with one or a plurality of operation terminals 15. In addition, a motion sensor 7 or the like that detects the presence of a person may be mounted on each indoor unit 12.

(2-2) Control Apparatus

Figure 3:
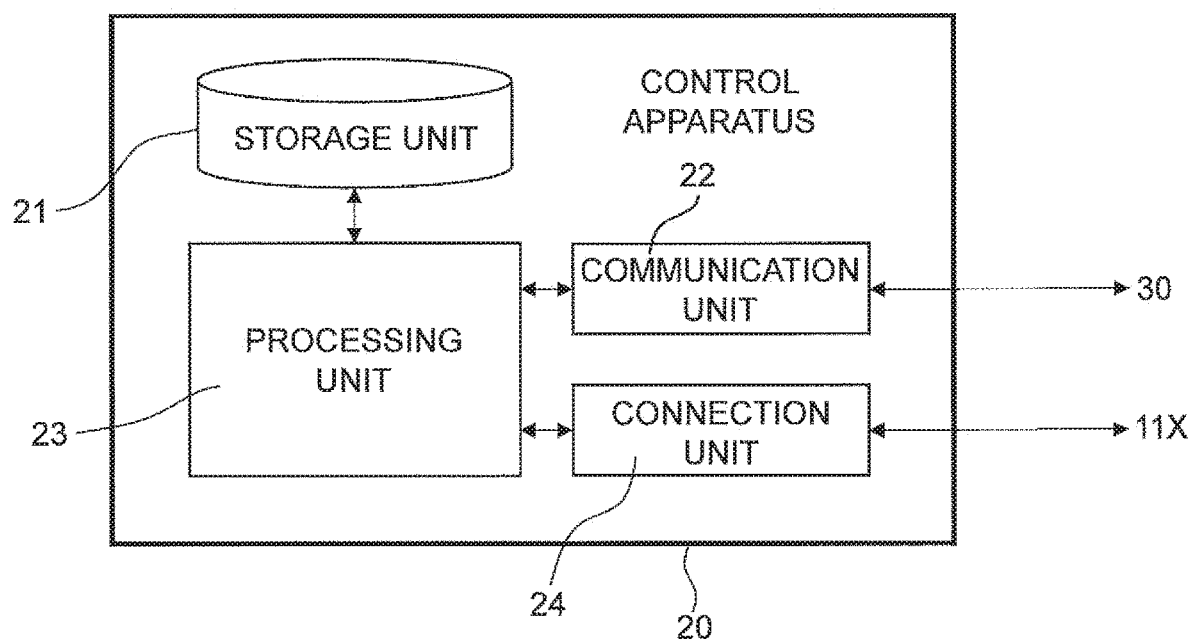
FIG. 3 is a schematic diagram illustrating the configuration of a control apparatus 20 according to the first embodiment.

The control apparatus 20 is mounted in the outdoor unit 11 of the air conditioner 10 and is connected to the outdoor unit control circuit 11X to control the air conditioner 10. As illustrated in FIG. 3, the control apparatus 20 includes a storage unit 21, a communication unit 22, a processing unit 23, and a connection unit 24.

The storage unit 21 stores therein various pieces of information and is constituted by a nonvolatile memory and/or a volatile memory or the like. The storage unit 21 also stores therein a program for executing various functions of the control apparatus 20. The storage unit 21 also stores therein "communication interval information" indicating a communication interval of each item of air conditioner information. The communication interval information stored in the storage unit 21 can be updated in response to receipt of instruction information from the management apparatus 30 which will be described below.

The communication unit 22 communicates with an external network. Here, the communication unit 22 connects to the network through wireless communication with the communication base station 4. With use of the function of the communication unit 22, various commands and various data are transmitted and received between the control apparatus 20 and the management apparatus 30.

The processing unit 23 executes various information processing operations. The processing unit 23 controls the communication unit 22 to communicate, with the management apparatus 30 at a predetermined communication interval, the air conditioner information corresponding to the outdoor unit 11 in which the control apparatus 20 is mounted. The processing unit 23 updates the communication interval information stored in the storage unit 21 in response to receipt of instruction information from the management apparatus 30 which will be described below.

Figure 4:
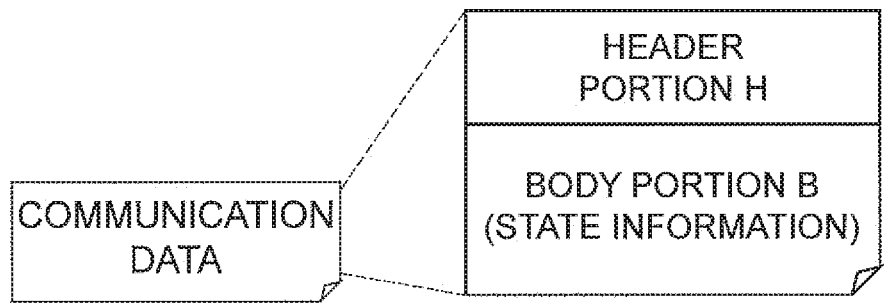
FIG. 4 is a schematic diagram illustrating a concept of the data structure of air conditioner information according to the first embodiment.

"Air conditioner information" includes a plurality of items, which are roughly classified into "state information" indicating the state of the air conditioner 10 and "instruction information" for changing the state of the air conditioner 10. The air conditioner information is specifically compatible with the communication protocol of HTTP1.1 and includes a header portion H and a body portion B as illustrated in FIG. 4. For example, the header portion H contains communication partner information or the like, and the body portion B contains the number of indoor units 12 connected to the outdoor unit 11, the identification numbers of the indoor units 12, state information about each indoor unit 12, and the like.

"State information" is information for monitoring the state of the air conditioner 10 and is collected by the outdoor unit control circuit 11X at a predetermined time interval. "State information" includes, for example, control information for an electrically powered valve, a motor, and other actuators belonging to the air conditioner 10, detected values obtained from the various sensors installed in the air conditioner 10, various abnormality codes, and the like.

"Instruction information" is information indicating an instruction input from operation terminal 15, such as a remote controller and/or an operation panel, and an instruction input from the external authorized-user terminal 40 through the network. "Instruction information" includes, for example, a start instruction and stop instruction for the air conditioner, a change instruction for a set temperature, and the like. The instruction information is transmitted in response to an inquiry of whether or not there is instruction information, the inquiry being transmitted from the control apparatus 20 to the management apparatus 30. Specifically, instruction information directly input to the management apparatus 30 and instruction information input from an external terminal or the like through the network are stored in the management apparatus 30. The control apparatus 20 asks, at a predetermined communication interval, the management apparatus 30 whether or not there is instruction information. When instruction information is stored in the management apparatus 30 (in the case of "present"), the management apparatus 30 transmits the details of the instruction information to the control apparatus 20 as a response to the above inquiry. On the other hand, when no instruction information is stored in the management apparatus 30 (in the case of "absent"), the management apparatus 30 transmits information indicating that there is no instruction information to the control apparatus 20 as a response to the above inquiry.

The connection unit 24 is used to connect to the outdoor unit control circuit 11X. The control apparatus 20 is able to transmit instruction information to the outdoor unit control circuit 11X and to obtain state information from the outdoor unit control circuit 11X via the connection unit 24.

(2-3) Management Apparatus

Figure 5:
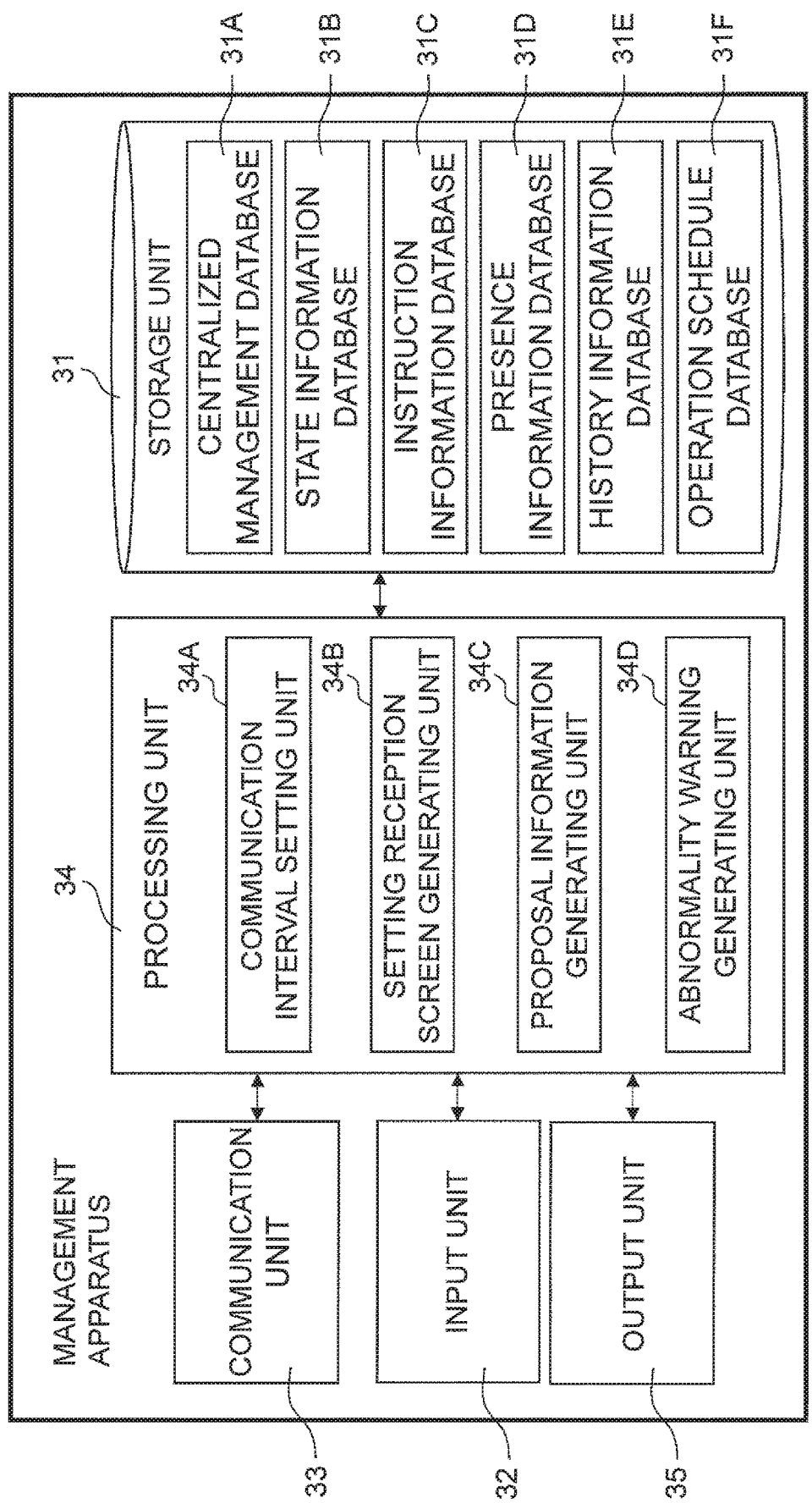
FIG. 5 is a schematic diagram illustrating the configuration of a management apparatus 30 according to the first embodiment.

As illustrated in FIG. 5, the management apparatus 30 includes a storage unit 31, an input unit 32, a communication unit 33, a processing unit 34, and an output unit 35.

The storage unit 31 stores therein various pieces of information and is constituted by a cache memory, a hard disk, and the like. The storage unit 31 includes a centralized management database 31A, a state information database 31B, an instruction information database 31C, a presence information database 31D, a history information database 31E, and an operation schedule database 31F.

The centralized management database 31A stores therein information related to the air conditioners 10 managed by the management apparatus 30. For example, the centralized management database 31A stores therein information on the facility 2 in which the air conditioners 10 are installed, information on the outdoor unit 11 and installation spaces 5a to 5d of the indoor units 12a to 12d in the facility 2, setting information set by an authorized user for each air conditioner 10, and the like. In addition, the centralized management database 31A stores therein, in association with the indoor units 12a to 12d, "communication interval information" in which the communication interval of each item of air conditioner information is set. Here, the air conditioner 10 is set to an operation mode or the like in accordance with the installation spaces 5a to 5d. The installation spaces 5a to 5d are classified according to the degree of importance or the like. Thus, the air conditioner 10 is operated in an operation mode in accordance with the degree of importance of each of the installation spaces 5a to 5d. The communication interval information is generated on the basis of presence information which will be described below.

The state information database 31B stores therein, in association with each indoor unit 12, various pieces of state information received from the control apparatus 20.

The instruction information database 31C stores therein instruction information for each of the air conditioners 10a to 10f input by a manager of the management apparatus 30, instruction information from the authorized-user terminal 40 which will be described below to each of the air conditioners 10a to 10f, and the like.

The presence information database 31D stores therein, in association with the installation spaces 5 of the air conditioner 10, presence information about the presence of a person, "Presence information" indicates, in association with the installation spaces 5a to 5d in which the indoor units 12a to 12d are respectively installed, the degree of presence of people in the installation spaces 5a to 5d in each time slot. The presence information may be set in advance or may be set as needed by using a motion sensor or the like. For example, as illustrated in FIG. 6, the presence information is classified into three states: "present", "intermediate", and "absent" in descending order of the number of people in the installation spaces 5 in each time slot.

The history information database 31E stores therein, in association with the installation spaces of the air conditioner 10, the history of presence information about the presence of a person. Specifically, the history information database 31E stores therein the history of three states: "present", "intermediate", and "absent" in each time slot as described above in association with the indoor units 12 or the installation spaces 5 of the indoor units 12.

The operation schedule database 31F stores therein, in association with the installation spaces 5a to 5d of the air conditioner 10, the operation schedule of the air conditioner 10. The operation schedule means the operation states of the air conditioner 10 in individual time slots. The operation schedule is used when the air conditioner 10 is externally controlled via the management apparatus 30.

The storage unit 31 stores therein arbitrary information in addition to the above-described various databases. For example, the storage unit 31 appropriately stores therein the history of an operation frequency or the like of the operation terminal 15. Also, for example, the storage unit 31 stores therein information indicating the correlation between the operation frequency or the like of the operation terminal 15 and an assumed operation status of the air conditioner 10.

The input unit 32 enables information to be input to the management apparatus 30 and is constituted by a keyboard, a mouse, and/or a touch screen or the like. For example, the input unit 32 enables information to be input to a setting reception screen which will be described below. A manager or the like is able to input instruction information for each air conditioner 10 and to input a change of various settings via the input unit 32.

The communication unit 33 communicates with the external network. Air conditioner information is received from the control apparatus 20 via the communication unit 33. The received air conditioner information is stored in the centralized management database 31A.

The processing unit 34 executes various information processing operations in the management apparatus 30 and is constituted by a CPU and a cache memory or the like. Here, the processing unit 34 functions as a communication interval setting unit 34A, a setting reception screen generating unit 34B, a proposal information generating unit 34C, and an abnormality warning generating unit 34D.

The communication interval setting unit 34A sets a communication interval at which the control apparatus 20 communicates air conditioner information with the management apparatus 30. Here, the communication interval setting unit 34A sets, in association with each of the indoor units 12a to 12d, a communication interval of each item of air conditioner information. The communication interval setting unit 34A has a function of setting a communication interval on the basis of the above-described operation schedule. Specifically, the communication interval setting unit 34A sets a short communication interval for a time slot in which the usage rate of the air conditioner 10 is high and sets a long communication interval for a time slot in which the usage rate is low. The communication interval setting unit 34A stores the set communication interval in the centralized management database 31A.

The communication interval setting unit 34A also has a function of changing, on the basis of presence information in the installation spaces 5a to 5d of the indoor units 12, the setting of a communication interval at which the control apparatus 20 communicates air conditioner information with the management apparatus 30.

The communication interval setting unit 34A also has a function of changing the communication interval in association with the types of the installation spaces 5a to 5d of the indoor units 12. The communication interval setting unit 34A also has a function of individually changing the communication interval in accordance with an item of air conditioner information. The communication interval setting unit 34A also has a function of individually changing the communication interval in accordance with state information or instruction information. The communication interval setting unit 34A further has a function of changing the communication interval on the basis of the history of presence information. The communication interval setting unit 34A further has a function of changing the communication interval on the basis of an operation schedule. The communication interval setting unit 34A further has a function of reading necessary information from the storage unit 31 and changing the communication interval on the basis of any of or an arbitrary combination of the number of operations, the operation frequency, and the operation details of the operation terminal 15. The communication interval setting unit 34A further has a function of changing the communication interval on the basis of a history in which all the plurality of operation terminals 15a to 15d turned off the plurality of indoor units 12a to 12d.

Figure 7:
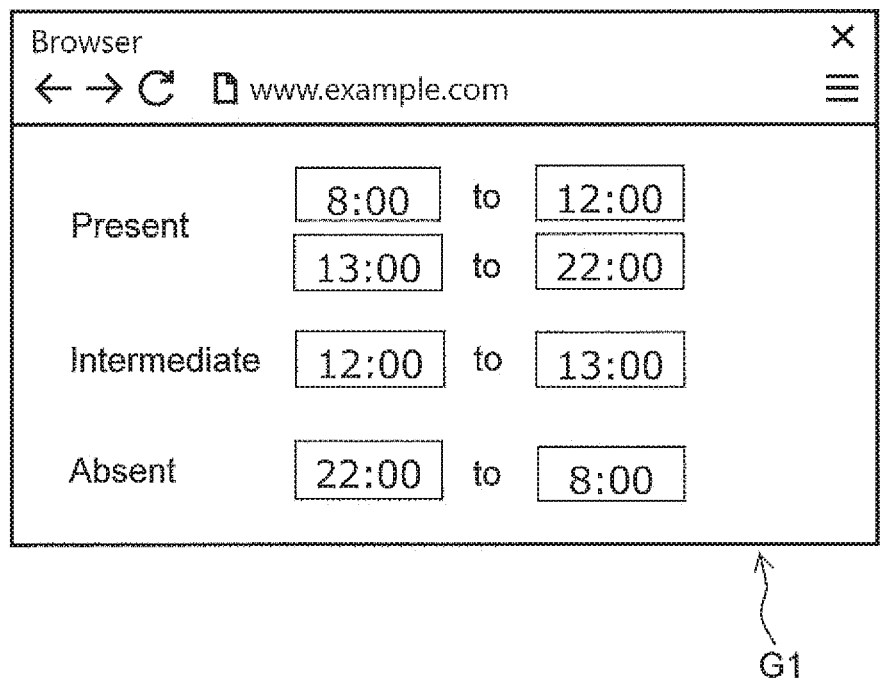
FIG. 7 is a schematic diagram illustrating an example of a first setting reception screen G1 according to the first embodiment.
Figure 8:
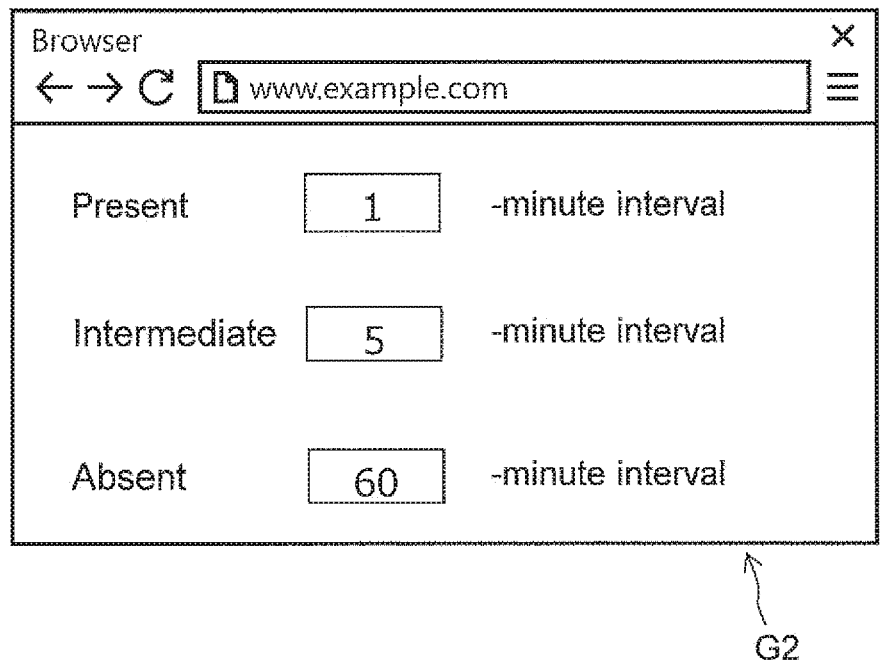
FIG. 8 is a schematic diagram illustrating an example of a second setting reception screen G2 according to the first embodiment.

The setting reception screen generating unit 34B generates a setting reception screen for receiving a setting of the communication interval. Specifically, the setting reception screen generating unit 34B generates a "setting reception screen" as those illustrated in FIGS. 7 and 8. Here, the setting of time slots corresponding to the three states: "present", "intermediate", and "absent" is received via a first setting reception screen G1 illustrated in FIG. 7. The information received on the first setting reception screen G1 is stored as presence information in the presence information database 31D. In FIG. 7, the time slots corresponding to the states "present", "intermediate", and "absent" are set to "8:00 to 12:00" and "13:00 to 22:00", "12:00 to 13:00", and "22:00 to 8:00", respectively. Also, the setting of communication intervals corresponding to the three states: "present", "intermediate", and "absent" is received via a second setting reception screen G2 illustrated in FIG. 8. In FIG. 8, the communication intervals "1 minute", "5 minutes", and "60 minutes" are set for the states "present", "intermediate", and "absent", respectively. The information received on the second setting reception screen G2 is compared with the information in the presence information database 31D, and the communication interval in each time slot is determined for each communication item of air conditioner information. The information indicating the determined communication intervals is stored in the centralized management database 31A. In this way, the manager of the management apparatus 30, the user of the authorized-user terminal 40, and the like are able to change communication intervals via these setting reception screens. The setting of a communication interval need not necessarily be performed for each communication item, but may be collectively performed for all the items or may be performed for each group of items.

The proposal information generating unit 34C generates "proposal information" for proposing a change in a communication interval on the basis of the history of presence information. Specifically, when a difference between the content of the presence information database 31D and the content of the history information database 31E occurs at a frequency set in advance or more, the proposal information generating unit 34C generates, on the basis of the content of the history information database 31E, proposal information for proposing changing the content of the presence information database 31D. Accordingly, change of the content of the presence information database 31D is promoted. As a result of update of the presence information, the communication interval is optimized. The proposal information is generated, for example, in the form of a proposal screen or the like displayed on a display device.

The abnormality warning generating unit 34D generates the content of "abnormality warning" on the basis of state information. Specifically, when the air conditioner information (state information) received from the control apparatus 20 includes an abnormality code, the abnormality warning generating unit 34D generates an abnormality warning including the identification number of the target air conditioner 10 and details of abnormality or the like.

The output unit 35 outputs various pieces of information and is constituted by a display and speaker or the like of various types. For example, the output unit 35 outputs a setting reception screen generated by the setting reception screen generating unit 34B. The output unit 35 also outputs proposal information generated by the proposal information generating unit 34C. The output unit 35 also outputs "abnormality warning" generated by the abnormality warning generating unit 34D.

The various pieces of information output by the output unit 35 can also be output to the authorized-user terminal 40 and the maintenance-worker terminal 50 through the network. In particular, when an abnormality warning is output by the output unit 35, the abnormality warning is output to a communication partner of the maintenance-worker terminal 50 registered in advance.

(2-4) Authorized-User Terminal

The authorized-user terminal 40 is a terminal used by an authorized user who is authorized to execute various instructions on the air conditioners 10. Each of the authorized-user terminals 40a to 40d connects to the management apparatus 30 through the network and transmits to the management apparatus 30 instruction information or the like for each of the air conditioners 10a to 10f.

The authorized user is an owner of a facility, a manager of a facility, a user of a facility, a manufacturer of the air conditioners 10, a seller of the air conditioners 10, or the like. The authority given to the authorized user varies according to the type of authorized user. That is, the type of instruction information that can be input to the air conditioners 10 varies according to the authority level given to each authorized-user terminal 40. In accordance with the authority level of the authorized-user terminal 40, change of a communication interval is allowed in some of the plurality of items of air conditioner information and is not allowed in some of the plurality of items of air conditioner information. Setting information of the authority level is stored in the centralized management database 31A of the management apparatus 30.

(2-5) Maintenance-Worker Terminal

The maintenance-worker terminal 50 is a terminal used by a maintenance worker of the air conditioners 10. The maintenance-worker terminal 50 receives an abnormality warning from the management apparatus 30. Accordingly, the maintenance worker becomes able to diagnose an abnormality of a target air conditioner 10 and to cope with failure.

(3) Communication in Air Conditioner Management System 1

(3-1) Basic Setting

Figure 9:
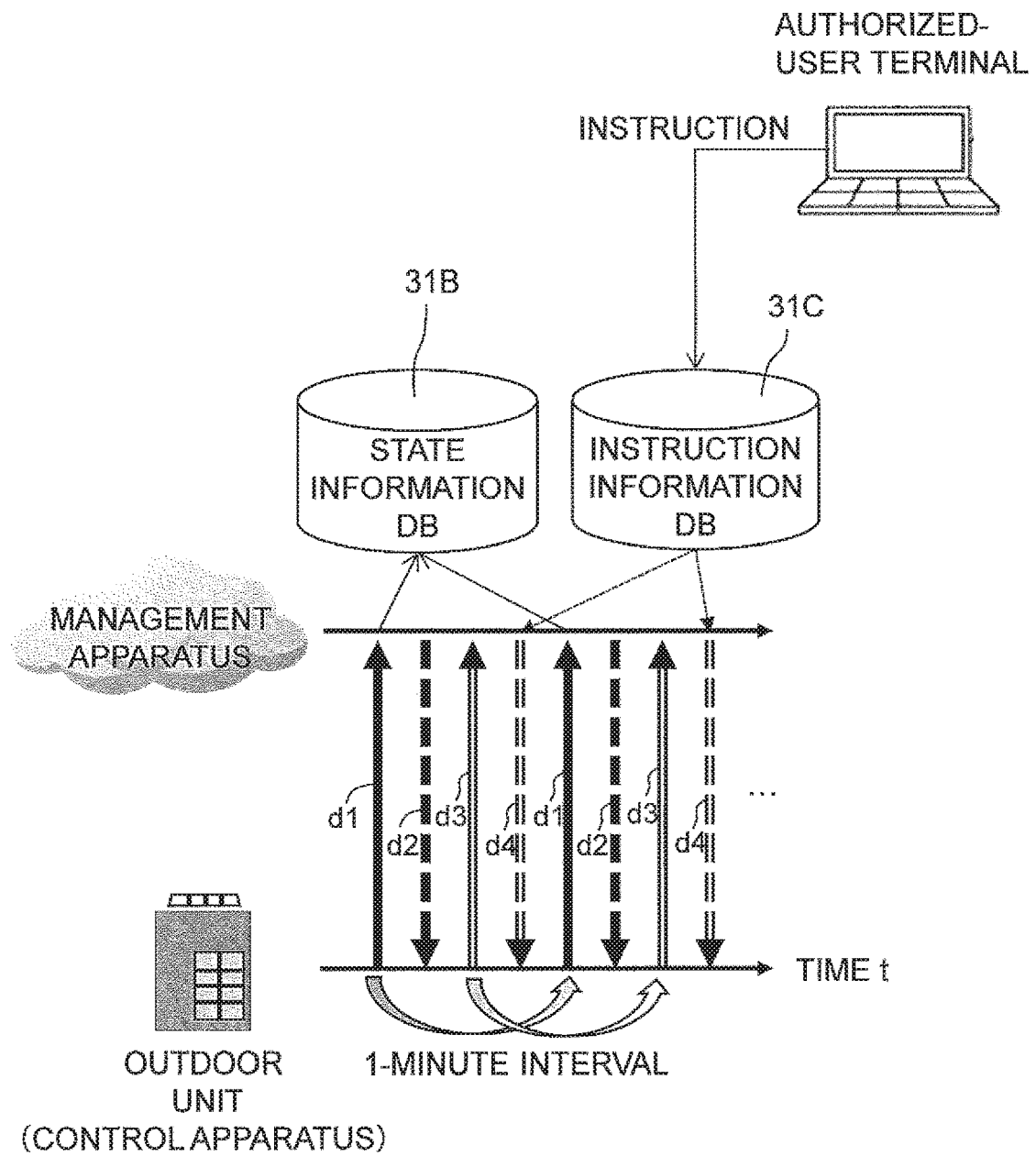
FIG. 9 is a schematic diagram for describing communication in a basic setting of the air conditioner management system 1 according to the first embodiment.

FIG. 9 is a schematic diagram for describing communication in a basic setting of the air conditioner management system 1 according to the present embodiment.

At the time of an initial operation or the like of each of the control apparatuses 20a to 20f of the air conditioner management system 1, communication is performed in a basic setting between the management apparatus 30 and each of the control apparatuses 20a to 20f. Specifically, one control apparatus 20 transmits "state information d1" to the management apparatus 30 at a communication interval set in advance (for example, at a 1-minute interval).

In response to receipt of the state information d1 from the control apparatus 20, the management apparatus 30 transmits "receipt acknowledgement d2" to the control apparatus 20. After receiving the receipt acknowledgement d2 from the management apparatus 30, the control apparatus 20 is in a standby state until next transmission of the state information d1.

Also, the control apparatus 20 transmits "determination request d3" for instruction information d4 to the management apparatus 30.

In response to receipt of the determination request d3 for the instruction information d4 from the control apparatus 20, the management apparatus 30 determines whether or not there is "instruction information d4" for the air conditioner 10 in which the control apparatus 20 is mounted. Specifically, the management apparatus 30 searches the instruction information database 31C to determine whether or not there is the instruction information d4 from the authorized-user terminal 40 or the like. If there is the instruction information d4, the management apparatus 30 transmits the instruction information d4 to the control apparatus 20. If there is not the instruction information d4, the management apparatus 30 transmits "information indicating that there is no instruction information" to the control apparatus 20. When the control apparatus 20 receives the instruction information d4, the control apparatus 20 changes the state of the air conditioner 10 in accordance with the instruction information d4. In this way, the air conditioner 10 is remote operated.

(3-2) Change Setting

Figure 10:
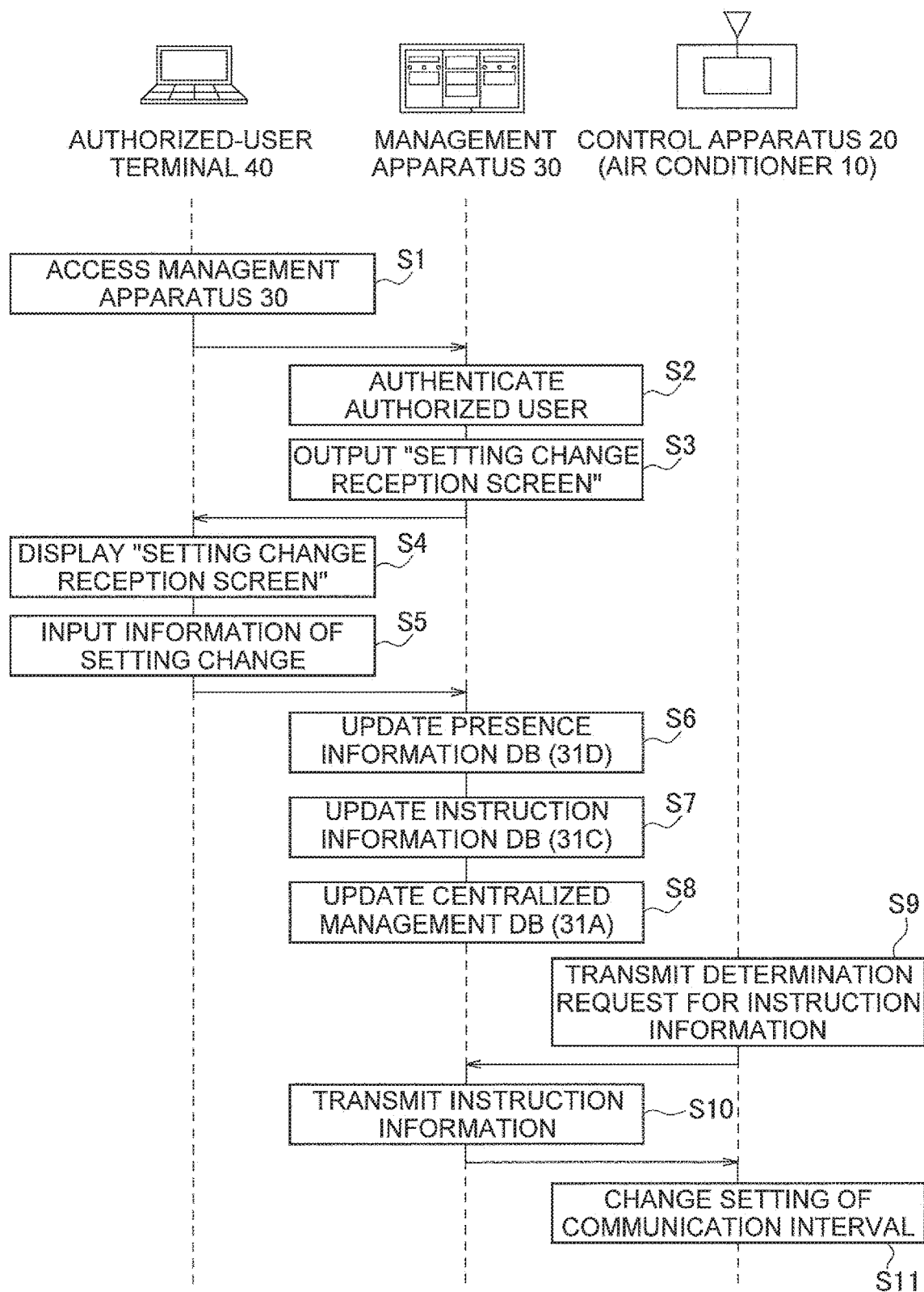
FIG. 10 is a sequence diagram for describing change of the setting of a communication interval in the air conditioner management system 1 according to the first embodiment.

FIG. 10 is a sequence diagram for describing change of the setting of a communication interval in the air conditioner management system 1 according to the present embodiment.

In the above basic setting, state information and instruction information are transmitted and received at a "predetermined communication interval". The management apparatus 30 according to the present embodiment, which includes the communication interval setting unit 34A, is able to change this communication interval.

First, the authorized user using the authorized-user terminal 40 accesses the management apparatus 30 and requests output of a setting change reception screen (S1). At this time, the management apparatus 30 authenticates the authorized user by various authentication means (S2). If the management apparatus 30 determines that the authorized user does not have authority, the process is suspended.

Subsequently, the management apparatus 30 outputs a setting change reception screen to the authorized-user terminal 40 (S3). Accordingly, the setting change reception screen is displayed on the authorized-user terminal 40 (S4).

Upon information of setting change being input by the authorized user via the setting change reception screen displayed on the authorized-user terminal 40, the input information is transmitted from the authorized-user terminal 40 to the management apparatus 30 (S5).

Subsequently, the management apparatus 30 updates the presence information in the presence information database 31D on the basis of the information received from the authorized-user terminal 40 (S6). Subsequently, on the basis of the updated presence information, the management apparatus 30 stores, as instruction information, a change instruction to change the communication interval at which air conditioner information is communicated in the instruction information database 31C (S7). At this time, the communication interval information stored in the centralized management database 31A is also updated (S8).

On the other hand, the control apparatus 20 transmits a determination request for instruction information to the management apparatus 30 at a communication interval that is currently set (S9). In response to receipt of the determination request in step S9, the management apparatus 30 transmits the change instruction stored in step S7 to the control apparatus 20 (S10). In response to receipt of the change instruction by the control apparatus 20, the processing unit 23 changes the communication interval information stored in the storage unit 21 (S11). After that, the control apparatus 20 transmits and receives air conditioner information to and from the management apparatus 30 at the communication interval changed in step S11.

(4) Characteristics 4-1

As described above, the air conditioner management system 1 according to the present embodiment includes the control apparatuses 20 and the management apparatus 30. Each control apparatus 20 communicates air conditioner information about the air conditioner 10 at a predetermined communication interval. The management apparatus 30 communicates air conditioner information with the control apparatus 20 and manages the air conditioner 10. The management apparatus 30 includes the communication interval setting unit 34A that changes, on the basis of presence information about the presence of a person in the installation spaces 5 of the air conditioner 10, the setting of the communication interval at which the air conditioner information is communicated.

Accordingly, the management apparatus 30 changes, on the basis of presence information about the presence of a person in the installation spaces 5 of the air conditioner 10, the communication interval at which the air conditioner information is communicated, and thus it is possible to provide the air conditioner management system 1 that is able to appropriately manage the air conditioner 10 while reducing a communication load.

Specifically, in the air conditioner management system 1, presence information in the installation spaces 5 of the air conditioner 10 is classified into "present", "intermediate", and "absent" in each time slot in accordance with the presence ratio of people. In the air conditioner management system 1, the interval of communication from the control apparatus 20 to the management apparatus 30 is extended to reduce the communication load in the time slot classified into "intermediate" or "absent".

Figure 11:
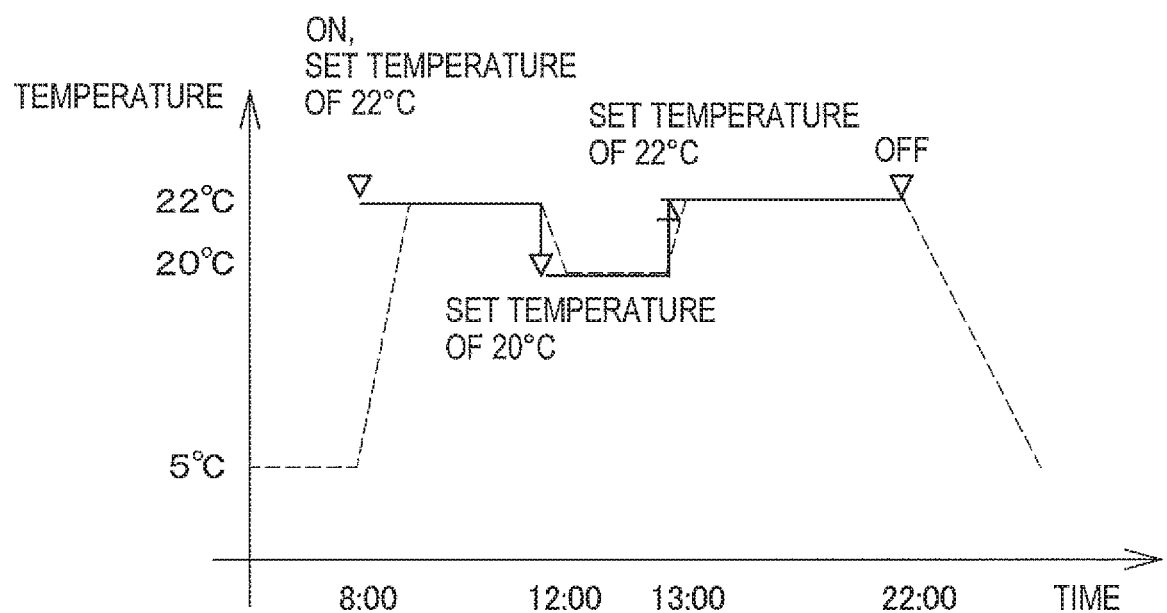
FIG. 11 is a schematic diagram illustrating an example of an operation model of the air conditioner 10.
Figure 12:
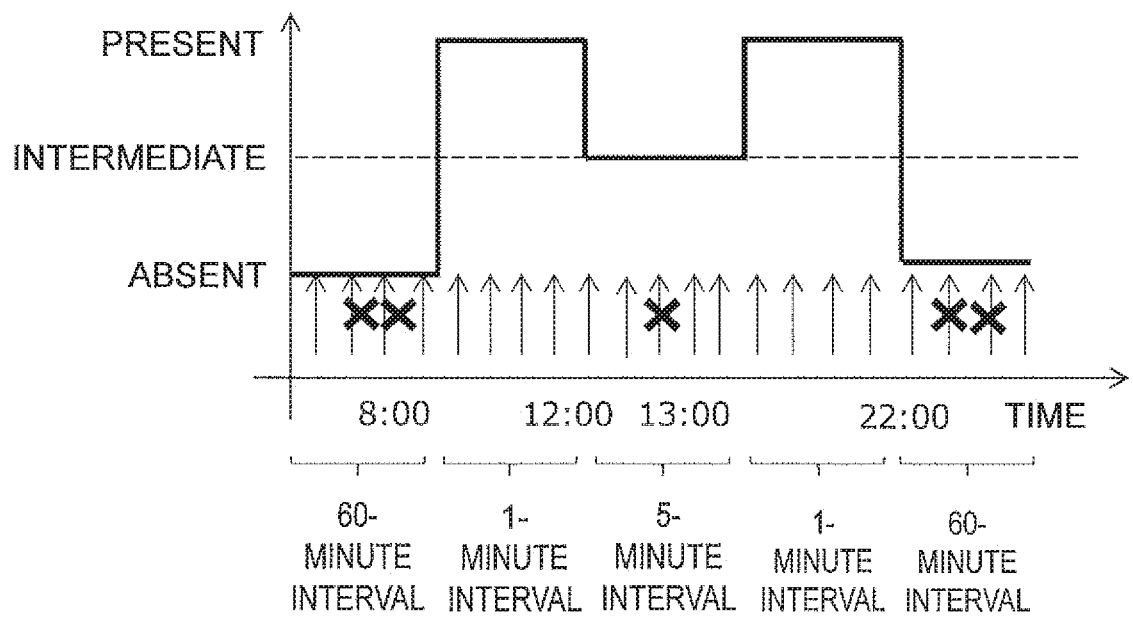
FIG. 12 is a diagram for describing change of the setting of a communication interval in the air conditioner management system 1 according to the first embodiment.

A supplementary description will be given of this with reference to FIGS. 11 and 12. FIG. 11 is a schematic diagram illustrating an example of an operation model of the air conditioner 10. In FIG. 11, the horizontal axis represents time slot and the vertical axis represents temperature. The solid line represents set temperatures, and the broken line represents room temperatures. In the operation model of the air conditioner 10 illustrated in FIG. 11, the classifications based on the presence ratio of people in the time slots 0:00 to 8:00, 8:00 to 12:00, 12:00 to 13:00, 13:00 to 22:00, and 22:00 to 0:00 are "absent", "present", "intermediate", "present", and absent", respectively. Thus, the settings illustrated in FIGS. 7 and 8 described above enable the communication interval to be extended in the time slots corresponding to "intermediate" and "absent" as illustrated in FIG. 12. Here, a cross (X) in FIG. 12 indicates that communication is not performed. In this way, the communication load in the air conditioner management system 1 can be reduced.

4-2

In the air conditioner management system 1 according to the present embodiment, the air conditioner 10 includes the outdoor unit 11 and the one or plurality of indoor units 12*a* to 12*d* connected to the outdoor unit 11. The communication interval setting unit 34A changes a communication interval on the basis of presence information about the presence of a person in the installation spaces 5*a* to 5*d* of the indoor units 12. Thus, the total amount of communication in the air conditioner management system 1 can be reduced to be optimized. Specifically, when the absence of people is determined in the installation spaces 5*a* to 5*d* of all the indoor units 12*a* to 12*d* in a situation where the plurality of indoor units 12*a* to 12*d* are connected to the single outdoor unit 11, the communication interval at which air conditioner information is transmitted and received can be extended to suppress an increase in the amount of communication.

4-3

In the air conditioner management system 1 according to the present embodiment, the air conditioner 10 includes the outdoor unit 11 and the indoor units 12*a* to 12*d* connected to the outdoor unit 11. The communication interval setting unit 34A changes a communication interval in association with the types of the installation spaces 5*a* to 5*d* of the indoor units 12*a* to 12*d*.

Accordingly, in the air conditioner management system 1, the communication interval setting unit 34A changes a communication interval in association with the types of the installation spaces 5 (a reception room, an office, a corridor, and so forth) of the indoor units 12, and thus the total amount of communication can be reduced to be optimized. That is, because the usage situation of each indoor unit 12 varies according to the type of the installation space 5 of the indoor unit 12, the communication interval at which the air conditioner information on the air conditioner 10 corresponding to an installation space where the usage rate is low is communicated is extended, thereby suppressing an increase in the amount of communication. Depending on the type of the installation space 5 of the indoor unit 12, highly frequent communication may be necessary regardless of the usage situation. In such a case, highly frequent communication is maintained. For example, when the type of the installation space 5 is registered as "reception room or the like" in the centralized management database 31A, highly frequent communication is maintained.

4-4

In the air conditioner management system 1 according to the present embodiment, air conditioner information includes a plurality of items. The communication interval setting unit 34A individually changes a communication interval in accordance with each item of the air conditioner information.

In this way, the air conditioner management system 1 is able to reduce and optimize the total amount of communication.

Furthermore, in the air conditioner management system 1 according to the present embodiment, air conditioner information includes "state information" indicating the state of the air conditioner 10 and "instruction information" for changing the state of the air conditioner 10. The communication interval setting unit 34A individually changes a communication interval in accordance with the state information or the instruction information. Accordingly, the total amount of communication can be reduced to be optimized. In addition, it is desired that the air conditioning environment of the installation spaces 5 of the air conditioner 10 be quickly changed in response to a request from a user or the like. Thus, the instruction information needs to be communicated highly frequently even in a time slot in which the air conditioner 10 is not operating. On the other hand, the state information is less necessary in a time slot in which the air conditioner 10 is not operating, and thus the communication frequency of the state information may be decreased to reduce the amount of communication.

4-5

In the air conditioner management system 1 according to the present embodiment, the management apparatus 30 includes the abnormality warning generating unit 34D that generates an abnormality warning on the basis of state information and the output unit 35 (abnormality warning output unit) that outputs the abnormality warning to the external maintenance-worker terminal 50 or the like. Accordingly, an abnormality warning can be transmitted to a maintenance worker as needed, and thus the air conditioner 10 can be appropriately managed.

4-6

In the air conditioner management system 1 according to the present embodiment, the management apparatus 30 includes the presence information database 31D (presence information storage unit) and the input unit 32 (setting receiving unit). The presence information database 31D stores therein a communication interval and presence information in association with each other for the installation space 5 of the air conditioner 10. The input unit 32 (setting receiving unit) receives the setting of a communication interval and presence information in association with the installation space 5 of the air conditioner 10.

In this way, in the air conditioner management system 1, the management apparatus 30 receives the setting of a communication interval and presence information in association with the installation space 5 of the air conditioner 10, and thus the communication interval at which air conditioner information is communicated can be changed on the basis of presence information about the presence of a person in the installation space 5 of the air conditioner 10.

Furthermore, in the air conditioner management system 1, the management apparatus 30 includes the setting reception screen generating unit 34B and the output unit 35 (setting reception screen output unit). The setting reception screen generating unit 34B generates a "setting reception screen" for receiving a setting of association between a communication interval and presence information. The output unit 35 outputs the setting reception screen to the management apparatus 30 or the authorized-user terminal 40 or the like. The input unit 32 (setting receiving unit) receives a setting of association between a communication interval and presence information on the basis of information input to the setting reception screen.

In this way, in the air conditioner management system 1, the management apparatus 30 outputs the setting reception screen for receiving a setting of a communication interval to the management apparatus 30 or the authorized-user terminal 40 or the like, and thus a manger, an authorized user, or the like is able to easily change the amount of communication in accordance with a situation.

4-7

In the air conditioner management system 1 according to the present embodiment, the management apparatus 30 includes the history information database 31E (presence information history storage unit). The history information database 31E stores the history of presence information in association with the installation space 5 of the air conditioner 10. The communication interval setting unit 34A changes a communication interval on the basis of the history of presence information.

In this way, in the air conditioner management system 1, the communication interval setting unit 34A changes, on the basis of the history of presence information, the communication interval at which air conditioner information is communicated, and thus the amount of communication in the entire system can be optimized. Accordingly, the setting of a communication frequency can be optimized on the basis of actual operation, and an excess of a communication frequency can be suppressed. Furthermore, the communication frequency of air conditioner information can be optimized by causing a computer to learn the history of presence information.

4-8

In the air conditioner management system 1 according to the present embodiment, the management apparatus 30 includes the history information database 31E (presence information history storage unit), the proposal information generating unit 34C, and the output unit 35 (proposal information output unit). The history information database 31E stores therein the history of presence information in association with the installation space 5 of the air conditioner 10. The proposal information generating unit 34C generates "proposal information" for proposing changing a communication interval on the basis of the history of presence information. The output unit 35 outputs the proposal information.

In this way, in the air conditioner management system 1, the management apparatus 30 outputs proposal information (a proposal screen or the like) for proposing changing a communication interval on the basis of the history of presence information, and thus it is possible to prompt a manager or the like to make a change to optimize the amount of communication.

4-9

In the air conditioner management system 1 according to the present embodiment, the management apparatus 30 further includes the operation schedule database 31F (operation schedule storage unit). The operation schedule database 31F stores therein the operation schedule of the air conditioner 10 in association with the installation space 5 of the air conditioner 10. In addition, the communication interval setting unit 34A sets presence information on the basis of the operation schedule.

Here, when new operation schedule data is stored in the operation schedule database 31F, the communication interval setting unit 34A recognizes, from the operation schedule, the operation status of the air conditioner 10 in each time slot, and automatically generates presence information on the basis of the operation status. Accordingly, in the air conditioner management system 1, the communication interval at which air conditioner information is communicated is automatically changed on the basis of the operation schedule.

4-10

In the air conditioner management system 1 according to the present embodiment, the air conditioner 10 is operated by the operation terminal 15 including a remote controller and an operation panel. The communication interval setting unit 34A changes a communication interval on the basis of the operation frequency of the operation terminal 15.

In this way, in the air conditioner management system 1, the communication interval setting unit 34A changes a communication interval on the basis of any of or an arbitrary combination of the number of operations, the operation frequency, and the operation details of the operation terminal 15, and thus the amount of communication can be optimized in accordance with a usage situation. In addition, there is a correlation between the operation frequency or the like of the operation terminal 15 and an assumed operation status of the air conditioner. Thus, the amount of communication can be changed to be optimized in accordance with an assumed operation status of the air conditioner 10 and the operation frequency or the like of the operation terminal 15.

4-11

In the air conditioner management system 1 according to the present embodiment, the plurality of indoor units 12a to 12d connected to the single outdoor unit 11 are operated while being respectively associated with the one or plurality of operation terminals 15a to 15d. The communication interval setting unit 34A changes a communication interval on the basis of the history in which the one or plurality of operation terminals 15a to 15d turned off all the plurality of indoor units 12a to 12d.

In this way, in the air conditioner management system 1, the communication interval setting unit 34A changes a communication interval on the basis of the history in which the one or plurality of operation terminals 15a to 15d turned off all the plurality of indoor units 12a to 12d, and thus the amount of communication can be optimized in accordance with a usage situation.

4-12

In the air conditioner management system 1 according to the present embodiment, the control apparatus 20 and the management apparatus 30 are connected to each other through wireless communication, and thus the air conditioner management system 1 can be easily introduced compared with a system using only wired communication. However, this does not exclude that the air conditioner management system 1 according to the present embodiment is a system using only wired communication.

4-13

In the air conditioner management system 1 according to the present embodiment, the control apparatus 20 and the management apparatus 30 communicate with each other by using the communication protocol of HTTP/1.1. Thus, the air conditioner management system 1 can be easily introduced compared with a system using another communication protocol. However, this does not exclude that the air conditioner management system 1 according to the present embodiment adopts another communication protocol.

(5) Modified Embodiment (5-1) Modified Embodiment 1A

According to the description given above, the management apparatus 30 includes the communication interval setting unit 34A to change a communication interval, but the air conditioner management system 1 according to the first embodiment is not limited thereto. For example, the processing unit 23 of the control apparatus 20 may have a function of changing the communication interval at which the control apparatus 20 transmits air conditioner information to the management apparatus 30. Specifically, the control apparatus 20 may determine the operation status of the air conditioner 10 on the basis of a determination criterion set in advance and may change the communication interval in accordance with a determination result.

Alternatively, the storage unit 21 of the control apparatus 20 may hold something equivalent to the databases of the storage unit 31 of the management apparatus 30, and the processing unit 23 of the control apparatus 20 may have a function of changing the communication interval at which the control apparatus 20 transmits air conditioner information to the management apparatus 30.

Alternatively, the control apparatus 20 may change the communication interval the basis of a change in the operation status of the air conditioner 10 operated by the operation terminal 15.

(5-2) Modified Embodiment 1B

In the air conditioner management system 1 according to the first embodiment, the motion sensor 7 attached to the indoor unit 12 may obtain presence information about the presence of a person. Specifically, the control apparatus 20 transmits a detected value of the motion sensor 7 to the management apparatus 30. Subsequently, the processing unit 34 of the management apparatus 30 determines, on the basis of the detected value of the motion sensor 7, which of "present", "intermediate", and "absent" is the state of the installation space 5 of the indoor unit 12, and generates presence information on the basis of the determination result. In addition, the management apparatus 30 is able to change, on the basis of the presence information obtained by the motion sensor 7, the communication interval at which air conditioner information is communicated.

In this way, in the air conditioner management system 1, presence information is automatically obtained by the motion sensor 7, and thus the communication interval at which air conditioner information is communicated can be automatically changed.

(5-3) Modified Embodiment 1C

In the air conditioner management system 1 according to the first embodiment, air conditioner information includes a plurality of items. From among the plurality of items, an arbitrary item can be selected as an item to be communicated between the control apparatus 20 and the management apparatus 30. Specifically, by directly inputting an instruction to the management apparatus 30 or inputting instruction information to the management apparatus 30 via the authorized-user terminal 40 through the network, an item of air conditioner information communicated between the control apparatus 20 and the management apparatus 30 can be added, changed, or deleted.

(5-4) Modified Embodiment 1D

In the air conditioner management system 1 according to the first embodiment, the management apparatus 30 is able to update the program of the control apparatus 20 through the network as needed. Accordingly, an item of air conditioner information communicated between the control apparatus 20 and the management apparatus 30 can be added, changed, or deleted appropriately.

(5-5) Modified Embodiment 1E

Figure 13:
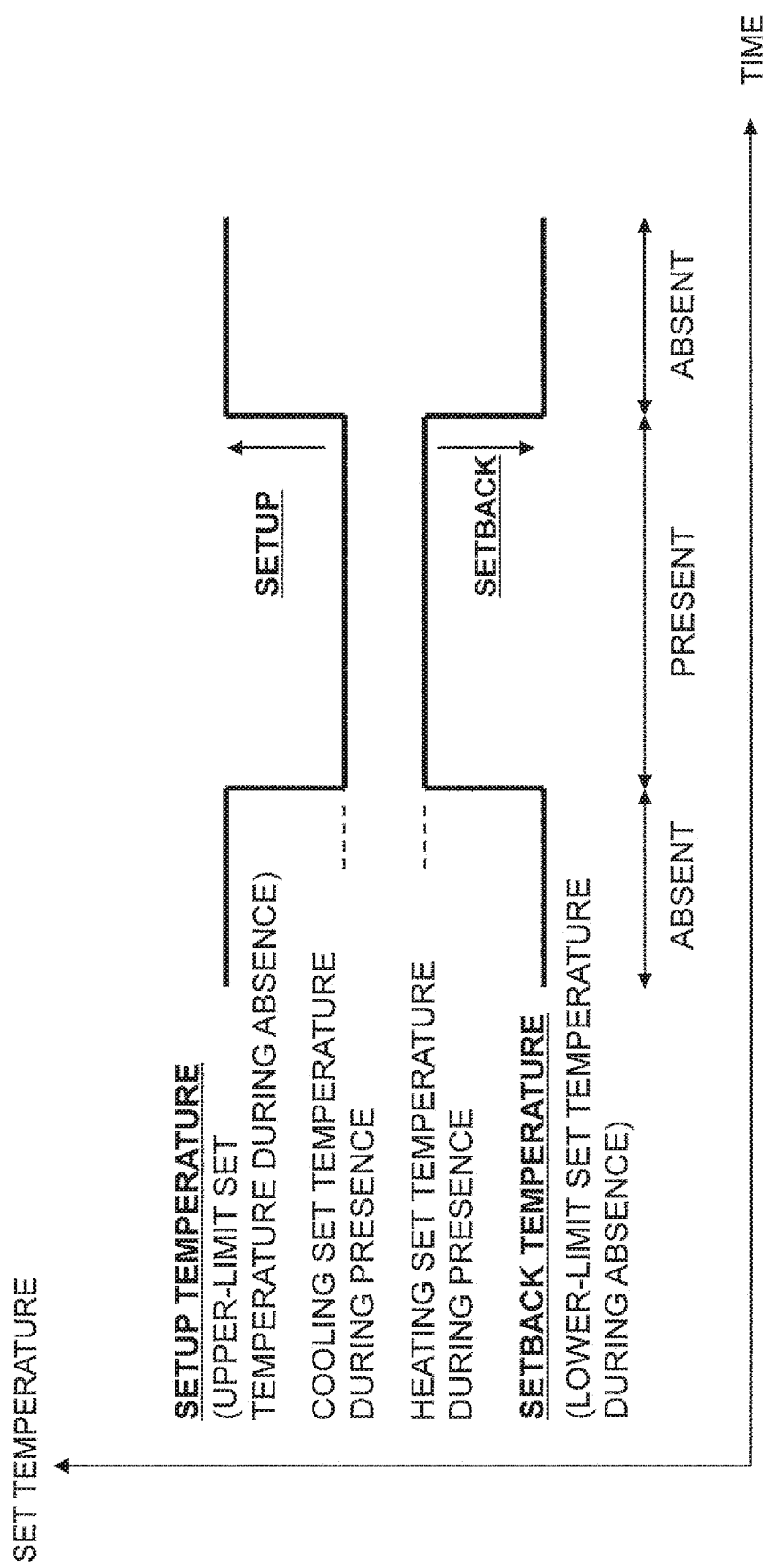
FIG. 13 is a diagram for describing a setback function.

In the air conditioner management system 1 according to the first embodiment, the air conditioner 10 can be controlled on the basis of an operation schedule. The air conditioner management system 1 may have a setback function. The setback function is a function of keeping the room temperature during absence within a semi-comfortable temperature range to suppress discomfort when entering a room and to suppress energy consumption during absence, as illustrated in FIG. 13. Accordingly, energy saving can be promoted with the comfort of end users maintained. The management apparatus 30 may have a function of changing, on the basis of a setback schedule, the communication interval at which air conditioner information is transmitted.

(5-6) Modified Embodiment 1F

In the air conditioner management system 1 according to the first embodiment, information indicating absence may be added to the air conditioner information immediately before a time slot of "absence". Accordingly, when transmission of air conditioner information from the control apparatus 20 ceases, the management apparatus 30 is able to determine whether the communication interval has been changed or whether an abnormality has occurred in the air conditioner 10.

Second Embodiment

(6) Overall Configuration of Air Conditioner Management System 1S

Figure 14:
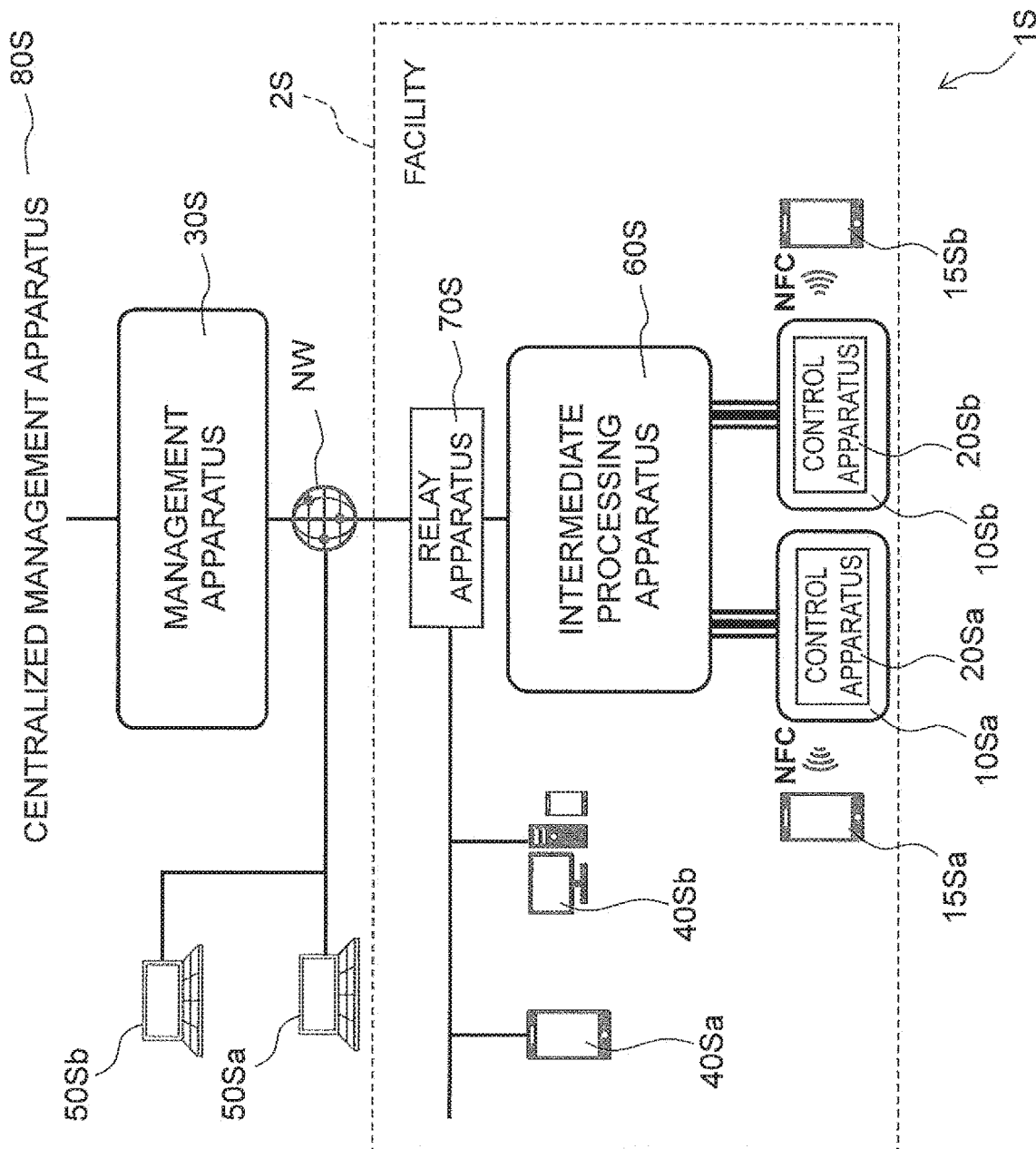
FIG. 14 is a schematic diagram illustrating the configuration of an air conditioner management system 1S according to a second embodiment of the present invention.

FIG. 14 is a schematic diagram illustrating the configuration of an air conditioner management system 1S according to a second embodiment of the present invention. Hereinafter, the same parts as those described above are denoted by almost the same reference numerals and a duplicate description will be omitted. In the present embodiment, S may be attached to reference numerals for distinction from another embodiment. When a common description is given of a plurality of apparatuses having similar functions, the description will be given while assigning the same reference numerals to the apparatuses. When a description is given while distinguishing individual apparatuses from each other, the description will be given while attaching a lower-case alphabetic letter to the reference numerals.

In the air conditioner management system 1S according to the present embodiment, an intermediate processing apparatus 60S is disposed between a management apparatus 30S and control apparatuses 20Sa and 20Sb respectively mounted in air conditioners 10Sa and 10b on a network NW. The intermediate processing apparatus 60S summarizes information collected by the control apparatuses 20Sa and 20Sb and communicates with the management apparatus 30S via a relay apparatus 70S or the like. That is, in the air conditioner management system 1S according to the present embodiment, the single management apparatus 30S manages the plurality of air conditioners 10a and 10b via the intermediate processing apparatus 60S. FIG. 14 illustrates the two air conditioners 10Sa and 10Sb for convenience of description, but the intermediate processing apparatus 60S is connectable to more air conditioners 10S.

In the air conditioner management system 1S, the management apparatus 30S is able to manage many air conditioners 10S while grouping them into a plurality of areas. In this case, the intermediate processing apparatus 605 manages a plurality of air conditioners 10S belonging to one of the areas. Alternatively, a configuration may be adopted in which a plurality of management apparatuses 30S are managed by a higher-level centralized management apparatus 80S. In short, the air conditioner management system 1S according to the present embodiment is able to manage many air conditioners 10S by an arbitrary management apparatus 30S and intermediate processing apparatus 605 forming a hierarchical structure.

Communication of air conditioner information among the management apparatus 30S, the control apparatuses 20Sa and 20Sb, and the intermediate processing apparatus 605 is performed in a wireless or wired manner. Communication of air conditioner information is performed by using, for example, the communication protocol of HTTP/1.1. However, the air conditioner information may be communicated by using another protocol. As in the air conditioner management system 1 according to the first embodiment, the management apparatus 30S connects to a plurality of authorized-user terminals 40Sa and 40Sb and a plurality of maintenance-worker terminals 50Sa and 50b through the network NW.

(7) Detailed Configuration of Air Conditioner Management System 1S

(7-1) Air Conditioner

The air conditioner 10S according to the present embodiment has a configuration and function similar to those of the air conditioner 10 according to the first embodiment. However, the control apparatus 20S which will be described below is disposed in the air conditioner 10S. The control apparatus 20S communicates with the management apparatus 305 via the intermediate processing apparatus 60S.

Figure 15:
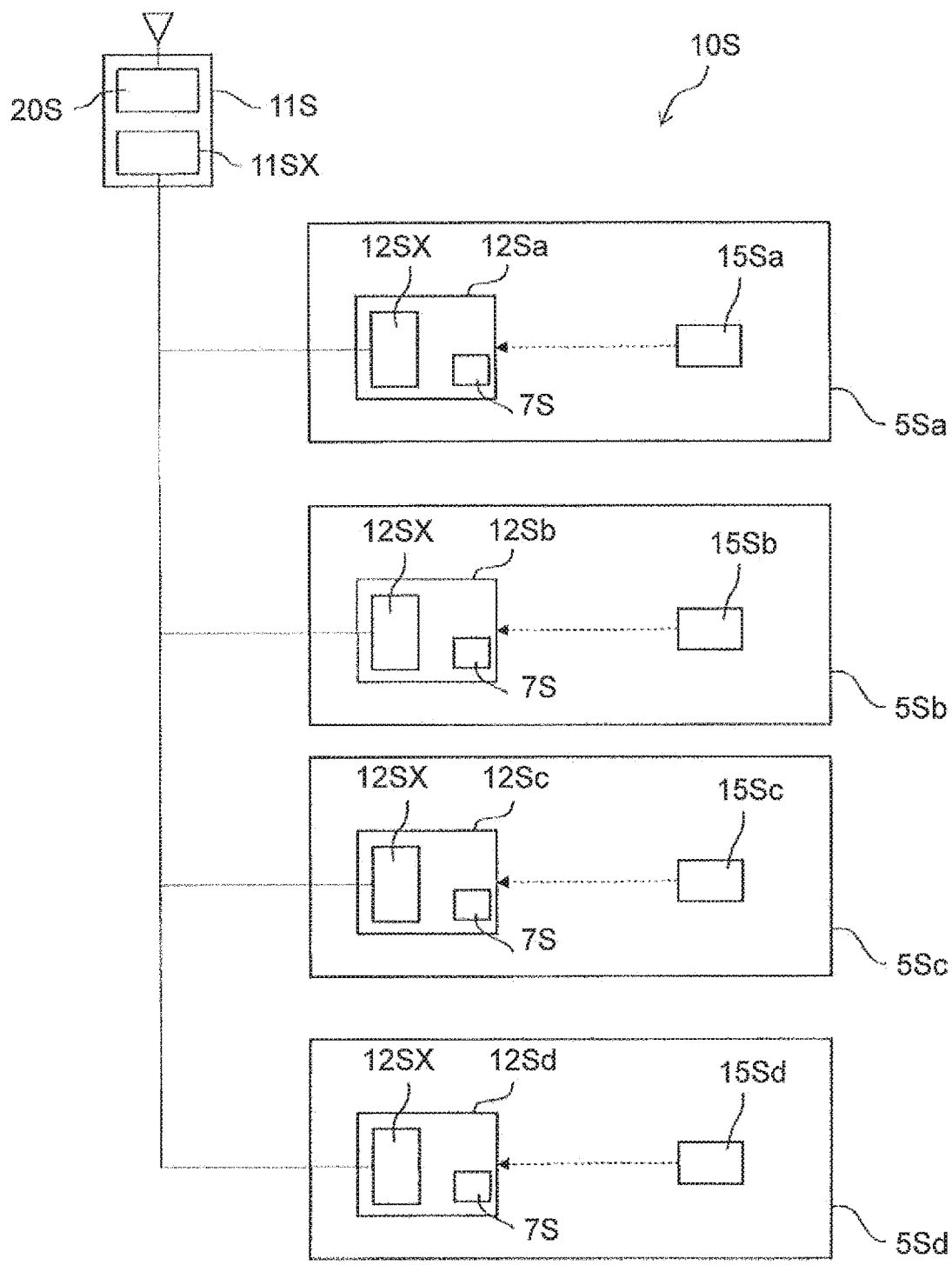
FIG. 15 is a schematic diagram illustrating the configuration of an air conditioner 10S according to the second embodiment.

As illustrated in FIG. 15, the air conditioner 10S includes an outdoor unit 11S and a plurality of indoor units 12Sa to 12Sd connected to the outdoor unit 11S through dedicated communication lines. Here, it is assumed that the indoor units 12Sa to 12Sd are installed in installation spaces 5Sa to 5Sd, respectively. The outdoor unit 11S includes an outdoor unit control circuit 11SX. Each of the indoor units 12Sa to 12Sd includes an indoor unit control circuit 12SX. In addition, the air conditioner 10 is appropriately attached with various sensors at predetermined positions. These sensors detect a room temperature, an ambient outside temperature, a discharge temperature and discharge pressure of refrigerant, and so forth. On the basis of detected values of the various sensors, the outdoor unit control circuit 11SX and the indoor unit control circuits 12SX cooperate with each other to control the operations of individual parts of the air conditioner 10S.

The air conditioner 10S is operated on the basis of instruction information received from an operation terminal 15S, such as a remote controller and/or an operation panel, and instruction information received from the external authorized-user terminal 40S through the network NW. More specifically, the air conditioner 10S can be operated through near field communication (NFC) by using the operation terminal 15S. The operation terminal 15S is a dedicated tablet apparatus or the like. A motion sensor 7S that detects the presence of a person may be mounted on each indoor unit 12S.

(7-2) Control Apparatus

Figure 16:
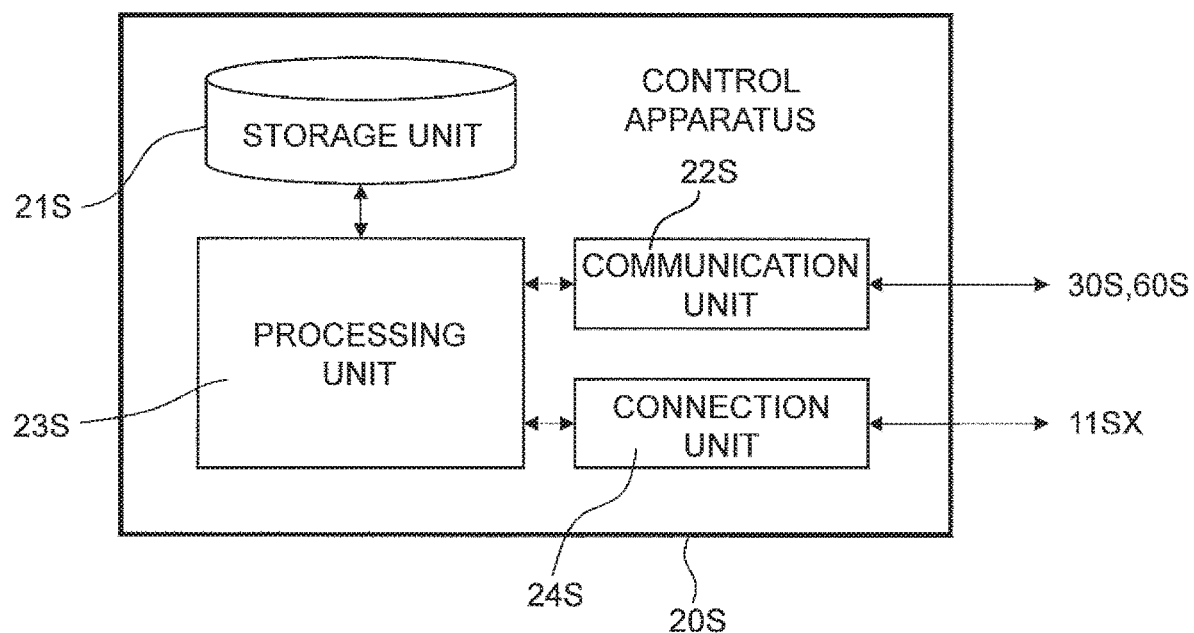
FIG. 16 is a schematic diagram illustrating the configuration of a control apparatus 20S according to the second embodiment.

As illustrated in FIG. 16, the control apparatus 20S includes a storage unit 21S, a communication unit 22S, a processing unit 23S, and a connection unit 24S. These units have configurations and functions similar to those of the storage unit 21, the communication unit 22, the processing unit 23, and the connection unit 24 according to the first embodiment, respectively. Note that, in the present embodiment, the communication unit 22S communicates with the control apparatus 20S and/or the intermediate processing apparatus 60S.

The control apparatus 20S is disposed in the outdoor unit 11S of the air conditioner 10S. The control apparatus 20S is connected to the outdoor unit control circuit 11SX. Accordingly, the control apparatus 20S is able to perform communication of the above-described "air conditioner information" with the intermediate processing apparatus 60S which will be described below. "Air conditioner information" includes a plurality of items, which are roughly classified into "state information" indicating the state of the air conditioner 10S and "instruction information" for changing the state of the air conditioner 10S. Thus, the control apparatus 20S transmits instruction information to the outdoor unit control circuit 11SX and obtains state information from the outdoor unit control circuit 11SX.

The control apparatus 20S is able to directly communicate with the management apparatus 30S without involving the intermediate processing apparatus 60S in accordance with a situation.

(7-3) Management Apparatus

The management apparatus 30S communicates air conditioner information (equipment information) with the intermediate processing apparatus 60S and the control apparatus 20S (information processing apparatus) under a predetermined communication condition and manages the air conditioners 10Sa and 10Sb. The management apparatus 30S has a configuration and function of adjusting a communication interval and a communication condition other than the communication interval in accordance with the states of the air conditioners 10Sa and 10Sb and/or the states of the installation spaces of the air conditioners 10Sa and 10Sb, in addition to the configuration and function of the management apparatus 30 according to the first embodiment. Here, "communication condition" means a condition that is determined by any of or an arbitrary combination of the number of items of air conditioner information, the data length of the air conditioner information, and the communication interval of the air conditioner information. Furthermore, the management apparatus 30S has a configuration and function of generating one or more candidate communication conditions under the assumption of adjusting the communication condition.

Figure 17:
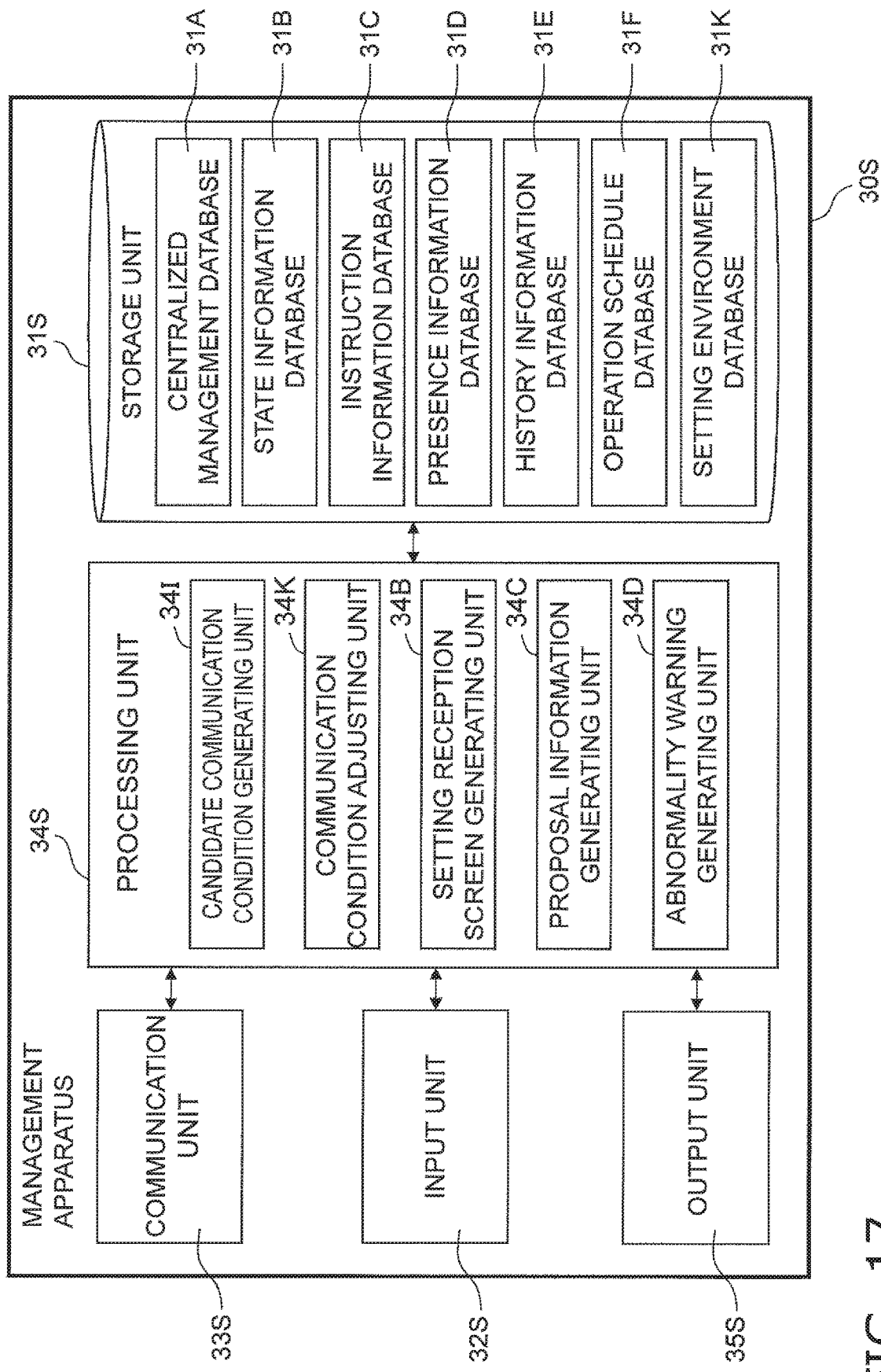
FIG. 17 is a schematic diagram illustrating the configuration of a management apparatus 30S according to the second embodiment.

As illustrated in FIG. 17, the management apparatus 30S includes a storage unit 31S, an input unit 32S, a communication unit 33S, a processing unit 34S, and an output unit 35S.

The storage unit 31S stores therein various pieces of information and is constituted by a cache memory, a hard disk, and the like. The storage unit 31S includes a centralized management database 31A, a state information database 31B, an instruction information database 31C, a presence information database 31D, a history information database 31E, an operation schedule database 31F, and so forth similar to those described above.

The storage unit 31S stores therein arbitrary information in addition to the above-described various databases. For example, as illustrated in FIG. 17, the storage unit 31S stores therein an installation environment database 31K indicating a "state of installation environment". The installation environment database 31K stores therein, as information indicating the state of an installation environment, information determined by any of or an arbitrary combination of the type of the installation space 5S of the air conditioner 10S, the installation position of the air conditioner 10S in the installation space 5S, the state of a constituent of the installation space 5S, and a time slot. "Type of installation space" is information classified according to the use of a room, for example, a president's room, a reception room, a server room, or the like. "Installation position" indicates the position of the air conditioner 10S in the installation space 5S and is classified into, for example, a perimeter zone, an interior zone, or the like. "State of a constituent of the installation space 5S" indicates the state of an arbitrary object in the installation space 5S and is classified into, for example, the opening/closing state of a door, the opening/closing state of a window, the illuminance level of a lighting device, or the like. "Time slot" indicates each of time slots to which one day is divided in units of 30 minutes. The storage unit 31S also stores therein information on a person who is present in the installation space 5S and/or information on an object disposed in the installation space 5S. The information on an object is, for example, information indicating the level of rottenness of fresh food. The information on a person and the information on an object are specified on the basis of measurement values or the like of various sensors attached to the air conditioner 10S or an external sensor. The state of the Installation environment can be reflected in the operation schedule of the air conditioner 10S.

The input unit 32S enables information to be input to the management apparatus 30S and is constituted by a keyboard, a mouse, and/or a touch screen or the like. For example, the input unit 32S enables information to be input to a setting reception screen. A manager or the like is able to input instruction information to each of the air conditioners 10Sa and 10Sb and to input a change of various settings via the input unit 32S.

The communication unit 33S communicates with the external network NW. Air conditioner information is transmitted to and received from the intermediate processing apparatus 60S via the communication unit 33S. The air conditioner information is stored in the storage unit 31S.

The processing unit 34S executes various information processing operations in the management apparatus 30 and is constituted by a CPU and a cache memory or the like. Here, the processing unit 34S has the functions of a candidate communication condition generating unit 34I and a communication condition adjusting unit 34K, as illustrated in FIG. 17, in addition to the functions of the processing unit 34 according to the first embodiment described above.

The candidate communication condition generating unit 34I generates one or more candidate communication conditions in accordance with the state of the air conditioner 10S and/or "the state of the installation space 5S" of the conditioner 10S. For example, the candidate communication condition generating unit 34I generates, as a candidate communication condition, a communication condition that reduces the amount of communication while maintaining communication of an item set in advance. Here, the state of the air conditioner 10S is determined on the basis of the above-described state information. The state of the installation space 5S is determined by any of or an arbitrary combination of the type of the installation space 5S of the air conditioner (equipment) 10S, the installation position of the air conditioner (equipment) 10S in the installation space 5S, the state of a constituent of the installation space 5S, and the time slot. Specifically, the state of the installation space 5S is specified on the basis of the state information on the air conditioner 10S and/or the data detected by the various sensors. The communication conditions generated by the candidate communication condition generating unit 34I can be output via the output unit 35S. The state of the installation space 5S includes presence information about the presence of a person in the installation space. Thus, the candidate communication condition generating unit 34I includes a part or whole of the function of the communication interval setting unit 34A.

In addition, the candidate communication condition generating unit 34I has a function of individually generating the above candidate communication conditions in accordance with an item of air conditioner information, that is, an item of state information or instruction information. At this time, the manager of the management apparatus 30 is able to set an item of air conditioner information via the input unit 32S.

In addition, the candidate communication condition generating unit 34I has a function of generating the above candidate communication conditions on the basis of presence information on a person in the installation space 5S of the indoor unit 12S and/or information on an object disposed in the installation space 5. In addition, the candidate communication condition generating unit 34I has a function of generating the above candidate communication conditions on the basis of the history of presence information on a person. In addition, the candidate communication condition generating unit 34I has a function of generating the above candidate communication conditions on the basis of an operation schedule. In addition, the candidate communication condition generating unit 34I has a function of generating the above candidate communication conditions on the basis of any of or an arbitrary combination of the number of operations, the operation frequency, and the operation details of the operation terminal 15S.

In addition, the candidate communication condition generating unit 34I has a function of generating the candidate communication conditions in association with the amount of communication and a communication path. That is, the candidate communication condition generating unit 34I generates, as the candidate communication conditions, communication conditions in which an optimum communication path is adopted in accordance with a change in the amount of communication. The candidate communication condition generating unit 34I outputs the candidate communication conditions associated with the amount of communication and the communication path to the output unit 35S.

In addition, the candidate communication condition generating unit 34I outputs, as the candidate communication conditions, communication paths satisfying a predetermined quality standard and communication charges for using the communication paths to the output unit 35S. Furthermore, the candidate communication condition generating unit 34I has a function of extracting, as a candidate communication condition, a communication path available at low communication charges from among the communication paths satisfying the predetermined quality standard. The predetermined quality standard is determined on the basis of the length of a communication time, a time of delay in communication, the amount of lost data, a data error rate, and the like.

The communication condition adjusting unit 34K decides on one communication condition from among the candidate communication conditions generated by the candidate communication condition generating unit 34I. In other words, the communication condition adjusting unit 34K determines a setting of any of or an arbitrary combination of the number of items of air conditioner information (equipment information), the data length of the air conditioner information (equipment information), and the communication interval of the air conditioner information (equipment information) as a communication condition. The communication condition adjusting unit 34K includes a part of the function of the communication interval setting unit 34A.

In addition, the communication condition adjusting unit 34K is able to determine a communication condition in accordance with a condition that is set in advance. Specifically, the communication condition adjusting unit 34K determines a communication condition so that the amount of communication is minimized with allowable minimal communication content being maintained. However, when a communication condition is designated via the input unit 32S, the communication condition adjusting unit 34K gives priority to the communication condition designated via the input unit 32S.

In addition, the communication condition adjusting unit 34K has a function of changing the communication path in accordance with a change in the amount of communication resulting from the adjustment of the communication condition. Specifically, the communication condition adjusting unit 34K selects a communication path available at the lowest communication charges from among the communication paths satisfying the predetermined quality standard.

The output unit 35S outputs various pieces of information and is constituted by a display and speaker or the like of various types.

(7-4) Authorized-User Terminal

The authorized-user terminal 40S is a terminal used by an authorized user who is authorized to execute various instructions on the air conditioners 10S. The authorized-user terminal 40S has the same configuration and function as those of the authorized-user terminal 40 according to the first embodiment.

(7-5) Maintenance-Worker Terminal

The maintenance-worker terminal 50S is a terminal used by a maintenance worker of the air conditioners 10S. The maintenance-worker terminal 50S has the same configuration and function as those of the maintenance-worker terminal 50 according to the first embodiment. The maintenance-worker terminal 50 receives an abnormality warning from the management apparatus 30, and accordingly the maintenance worker becomes able to diagnose an abnormality of a target air conditioner 10 and to cope with failure.

(7-6) Intermediate Processing Apparatus

The intermediate processing apparatus 60S connects to one or more control apparatuses 20S and the management apparatus 30S and communicates air conditioner information with these apparatuses. That is, the intermediate processing apparatus 60S obtains air conditioner information (equipment information) about the air conditioner 10S (equipment) via the control apparatus 20S. Subsequently, the intermediate processing apparatus 60S transmits the air conditioner information to the management apparatus 30S.

Figure 18:
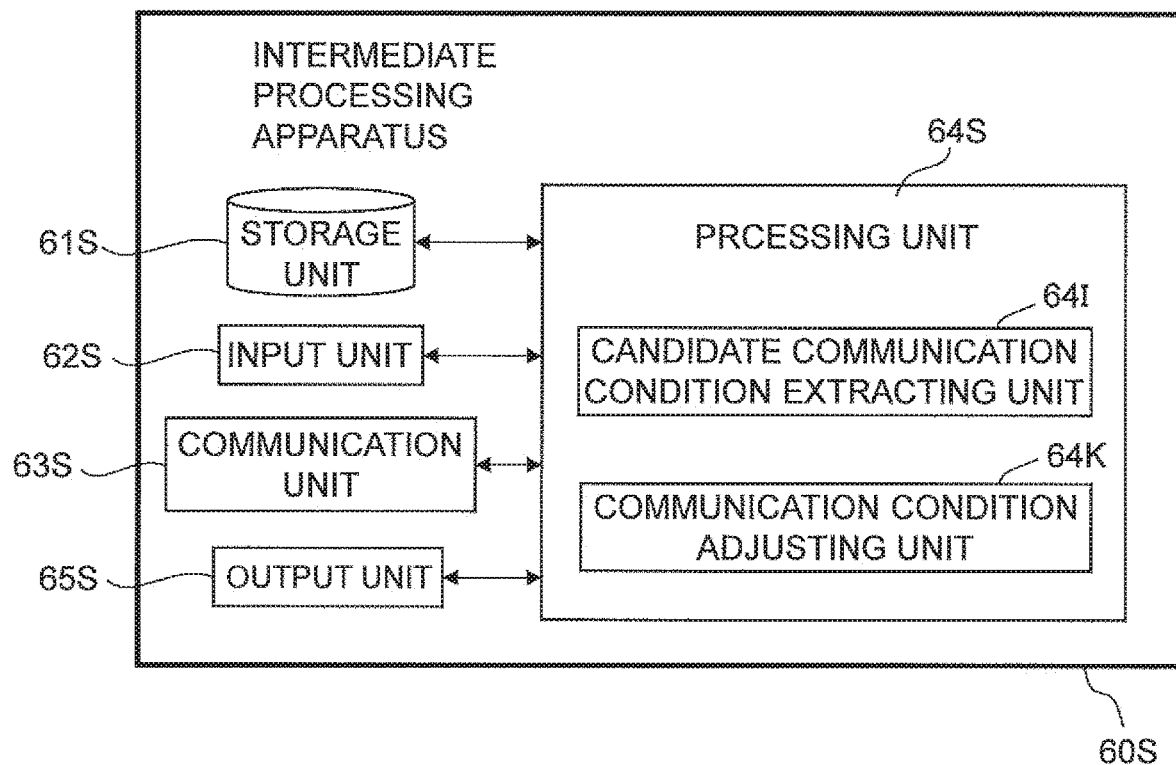
FIG. 18 is a schematic diagram illustrating the configuration of an intermediate processing apparatus 60S according to the second embodiment.

In addition, the intermediate processing apparatus 60S has a part of the configuration and function of the management apparatus 30S and is configured to be able to adjust a communication condition of air conditioner information. Specifically, as illustrated in FIG. 18, the intermediate processing apparatus 60S includes a storage unit 61S, an input unit 62S, a communication unit 63S, a processing unit 64S, and an output unit 65S.

The storage unit 61S stores therein various pieces of information and is constituted by a cache memory, a hard disk, and the like. The storage unit 61S also stores therein a program for executing various functions of the intermediate processing apparatus 60S. The storage unit 61S stores therein information about the control apparatus 20S connected to the intermediate processing apparatus 60S out of the information stored in the storage unit 31S of the management apparatus 30S. The information stored in the storage unit 61S of the intermediate processing apparatus 60 and the information stored in the storage unit 31S of the management apparatus 30S are appropriately synchronized with each other.

The input unit 62S enables information to be input to the intermediate processing apparatus 60S and is constituted by a keyboard, a mouse, and/or a touch screen or the like.

The communication unit 63S communicates with an external apparatus through the network NW. Here, the communication unit 63S communicates with one or more control apparatuses 20S and the management apparatus 30S in a wireless or wired manner. With use of the function of the communication unit 63S, various commands and various data are transmitted and received between the control apparatus 20S and the intermediate processing apparatus 60S.

The processing unit 64S executes various information processing operations in the intermediate processing apparatus 60S and is constituted by a CPU and a cache memory or the like. The processing unit 64S updates the setting of the communication condition stored in the storage unit 61S in response to receipt of instruction information from the management apparatus 30S which will be described below. Here, the processing unit 64S functions as a candidate communication condition generating unit 64I and a communication condition adjusting unit 64K, as illustrate in FIG. 18.

The candidate communication condition generating unit 64I has a function similar to that of the candidate communication condition generating unit 34I of the management apparatus 30S. That is, the candidate communication condition generating unit 64I generates one or more candidate communication conditions in accordance with the state of the air conditioner 10S and/or "the state of the installation space 5S" of the air conditioner 10S. Here, the state of the air conditioner 10S is determined on the basis of the above-described state information. The state of the installation space 5S is determined by any of or an arbitrary combination of the type of the installation space 5S of the air conditioner (equipment) 10S, the installation position of the air conditioner (equipment) 10S in the installation space 5S, the state of a constituent of the installation space 5S, and the time slot. These pieces of information are specified on the basis of the state information on the air conditioner 10S and/or the data detected by the various sensors. The communication conditions generated by the candidate communication condition generating unit 64I can be output via the output unit 65S.

In addition, the candidate communication condition generating unit 64I has a function of individually generating the above candidate communication conditions in accordance with an item of air conditioner information, that is, an item of state information or instruction information. At this time, the manager of the intermediate processing apparatus 60S is able to set an item of air conditioner information via the input unit 62S.

In addition, the candidate communication condition generating unit 64I has a function of generating the above candidate communication conditions on the basis of presence information on a person in the installation space 5S of the indoor unit 12S and/or information on an object disposed in the installation space 5. In addition, the candidate communication condition generating unit 64I has a function of generating the above candidate communication conditions on the basis of the history of presence information on a person. In addition, the candidate communication condition generating unit 64I has a function of generating the above candidate communication conditions on the basis of an operation schedule. In addition, the candidate communication condition generating unit 64I has a function of generating the above candidate communication conditions on the basis of any of or an arbitrary combination of the number of operations, the operation frequency, and the operation details of the operation terminal 15S.

In addition, the candidate communication condition generating unit 64I has a function of generating the candidate communication conditions in association with the amount of communication and a communication path. The candidate communication condition generating unit 64I outputs the candidate communication conditions associated with the amount of communication and the communication path to the output unit 65S.

In addition, the candidate communication condition generating unit 64I has a function of generating the candidate communication conditions in association with the amount of communication and a communication path. That is, the candidate communication condition generating unit 64I generates, as the candidate communication conditions, communication conditions in which an optimum communication path is adopted in accordance with a change in the amount of communication. The candidate communication condition generating unit 64I outputs the candidate communication conditions associated with the amount of communication and the communication path to the output unit 65S.

In addition, the candidate communication condition generating unit 64I outputs, as the candidate communication conditions, communication paths satisfying a predetermined quality standard and communication charges for using the communication paths to the output unit 65S. Furthermore, the candidate communication condition generating unit 64I has a function of extracting, as a candidate communication condition, a communication path available at low communication charges from among the communication paths satisfying the predetermined quality standard. The predetermined quality standard is determined on the basis of the length of a communication time, a time of delay in communication, the amount of lost data, a data error rate, and the like.

The communication condition adjusting unit 64K has a function similar to that of the communication condition adjusting unit 34K of the management apparatus 30S. That is, the communication condition adjusting unit 64K determines a setting of any of or an arbitrary combination of the number of items of air conditioner information (equipment information), the data length of the air conditioner information (equipment information), and the communication interval of the air conditioner information (equipment information) as a communication condition. Here, the communication condition adjusting unit 64K is able to determine a communication condition in accordance with a condition that is set in advance. Specifically, the communication condition adjusting unit 64K determines a communication condition so that the amount of communication is minimized with allowable minimal communication content being maintained. However, when a communication condition is designated via the input unit 62S, the communication condition adjusting unit 64K gives priority to the communication condition designated via the input unit 62S.

In addition, the communication condition adjusting unit 64K has a function of changing the communication path in accordance with a change in the amount of communication resulting from the adjustment of the communication condition. Specifically, the communication condition adjusting unit 64K selects a communication path available at the lowest communication charges from among the communication paths satisfying the predetermined quality standard.

The output unit 65S outputs various pieces of information and is constituted by a display and speaker or the like of various types.

(8) Communication in Air Conditioner Management System 1S

(8-1) Basic Setting

Communication in a basic setting in the air conditioner management system 1S according to the present embodiment is similar to that in the air conditioner management system 1 according to the first embodiment (see FIG. 9).

(8-2) Adjustment of Communication Condition by Management Apparatus 30S

Figure 19:
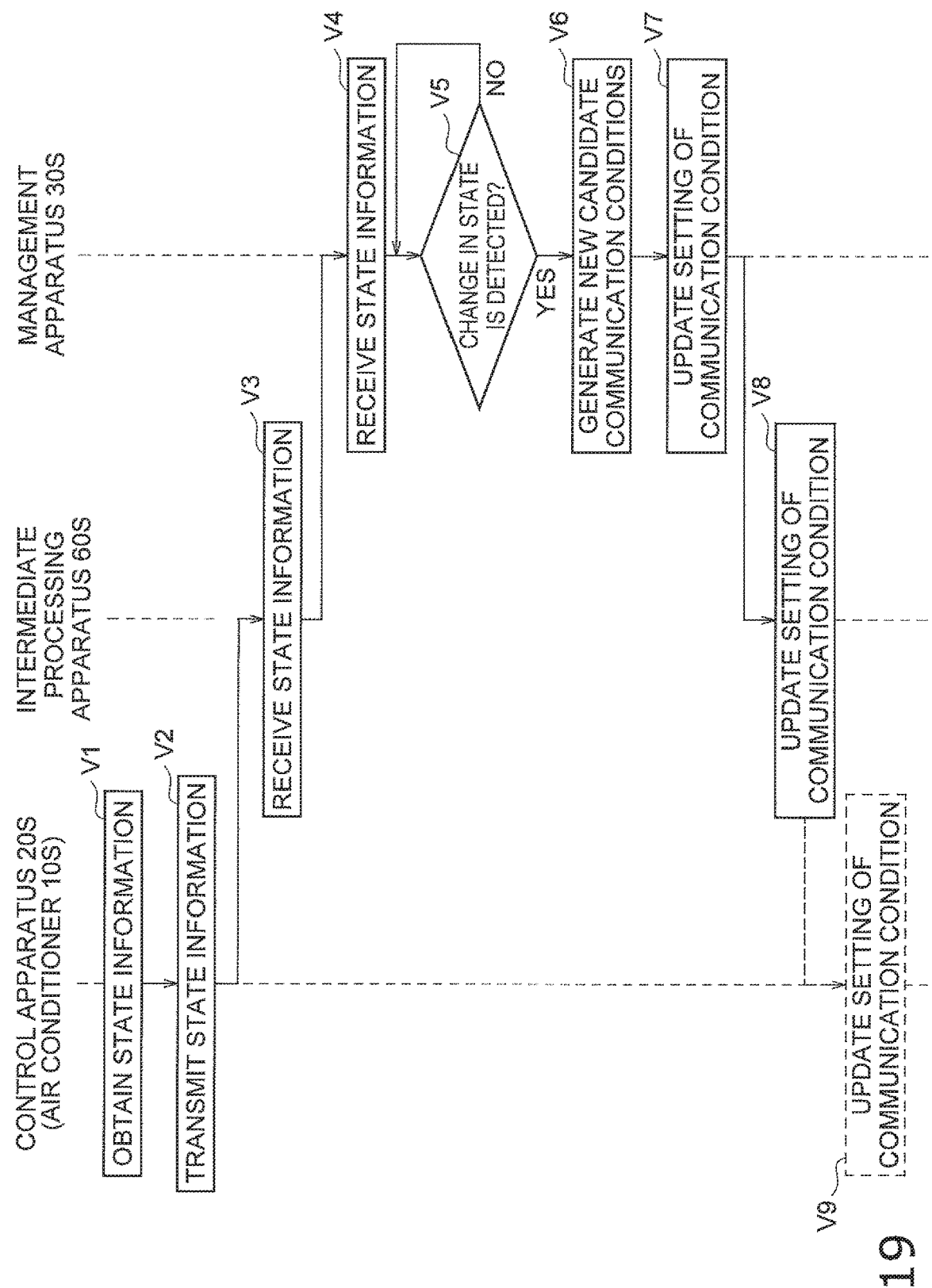
FIG. 19 is a sequence diagram for describing adjustment of a communication condition by the management apparatus 30S according to the second embodiment.

The management apparatus 30S according to the present embodiment, which includes the communication condition adjusting unit 34K, is able to appropriately adjust the condition of communication between the management apparatus 30S and another apparatus. Specifically, the communication condition is adjusted in the procedure illustrated in the sequence diagram in FIG. 19.

First, the state information on the air conditioner 10S in which the control apparatus 20S is disposed is obtained by using the function of the control apparatus 20S (V1). Subsequently, the control apparatus 20S transmits the obtained state information on the air conditioner 10S to the intermediate processing apparatus 60S (V2).

When receiving the state information from the control apparatus 20S, the intermediate processing apparatus 60S transmits the state information to the management apparatus 30S under a predetermined communication condition (V3).

The management apparatus 30S receives the state information on the air conditioner 10S and manages the air conditioner 10S on the basis of the received state information (V4). Here, the management apparatus 30S specifies the state of the air conditioner 10S and/or the state of the installation space 5S of the air conditioner 10S on the basis of predetermined state information that is set in advance. Subsequently, the management apparatus 30S determines whether or not these states are beyond a setting range that is set in advance (V5).

If the management apparatus 30S determines that each of the states is within the setting range, the management apparatus 30S determines that a change in the state has not been detected and ends the process (No in V5).

On the other hand, if the management apparatus 30S determines that each of the states is beyond the setting range, the management apparatus 30S generates new candidate communication conditions on the basis of the change in the state information (Yes in V5, V6). Specifically, the candidate communication condition generating unit 34I of the management apparatus 30S changes the setting of any of or an arbitrary combination of the number of items of air conditioner information, the data length of the air conditioner information, and the communication interval of the air conditioner information, and generates the changed setting as new candidate communication conditions. Subsequently, the communication condition adjusting unit 34K of the management apparatus 30S decides on one communication condition from among the new candidate communication conditions. At this time, the management apparatus 30S may output the details of the new candidate communication conditions to the management apparatus 30S and/or the intermediate processing apparatus 60S and may decide on a communication condition after receiving a response. Subsequently, the management apparatus 30S updates the setting of the communication condition on the basis of the decision (V7).

Subsequently, the management apparatus 30S transmits information about the adjusted communication condition to the intermediate processing apparatus 60S. When receiving the information about the adjusted communication condition from the management apparatus 30S, the intermediate processing apparatus 60S updates the setting of the communication condition stored in the intermediate processing apparatus 60S (V8). Accordingly, the communication between the intermediate processing apparatus 60S and the management apparatus 30S is performed under the adjusted communication condition.

The intermediate processing apparatus 60S transmits the information about the adjusted communication condition to the control apparatus 20S as necessary. When receiving the information about the adjusted communication condition from the intermediate processing apparatus 60S, the control apparatus 20S updates the setting of the communication condition stored in the control apparatus 20S (V9). Accordingly, the communication between the control apparatus 20S and the intermediate processing apparatus 60S is performed under the adjusted communication condition.

Figure 20:
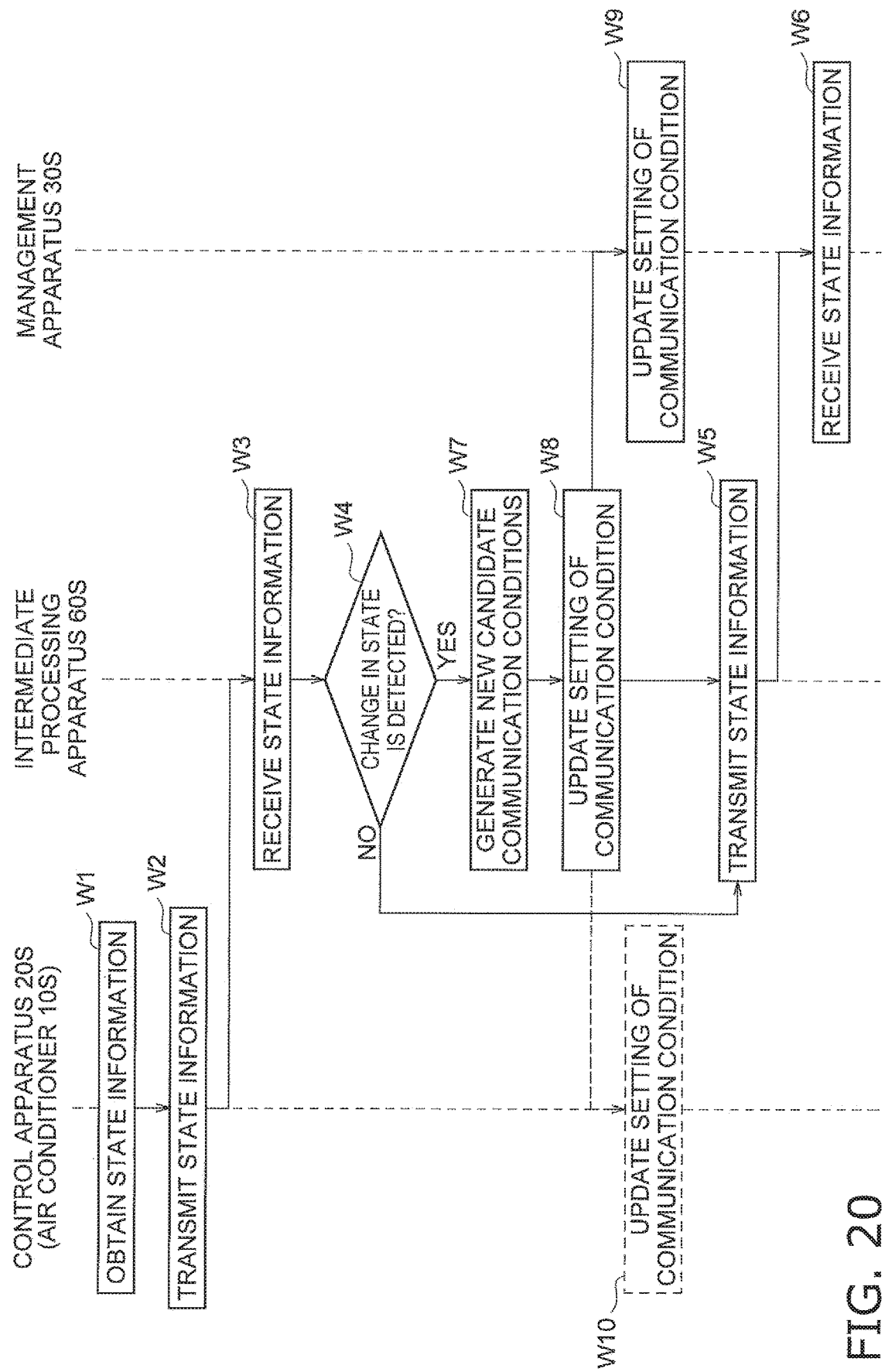
FIG. 20 is a sequence diagram for describing adjustment of a communication condition by the intermediate processing apparatus 60S according to the second embodiment.

(8-3) Adjustment of Communication Condition by Intermediate Processing Apparatus 60S The intermediate processing apparatus 60S according to the present embodiment, which includes the communication condition adjusting unit 64K, is able to adjust the condition of communication between the management apparatus 30S and another apparatus. Specifically, the communication condition is adjusted in the procedure illustrated in the sequence diagram in FIG. 20. Whether to adjust the communication condition by the intermediate processing apparatus 60S or to adjust the communication condition by the management apparatus 30S can be appropriately selected in accordance with a situation.

First, state information is obtained from the air conditioner 10S connected to the control apparatus 20S by using the function of the control apparatus 20S (W1). Subsequently, the control apparatus 20S transmits the obtained state information on the air conditioner 10S to the intermediate processing apparatus 60S (W2).

When receiving the state information from the control apparatus 20S, the intermediate processing apparatus 60S specifies the state of the air conditioner 10S and/or the state of the installation space of the air conditioner 10S on the basis of predetermined state information that is set in advance (W3). Subsequently, the intermediate processing apparatus 60S determines whether or not these states are beyond the setting range that is set in advance (W4). If the intermediate processing apparatus 60S determines that each of the states is within the setting range, the intermediate processing apparatus 60S determines that a change in the state has not been detected and transmits the state information to the management apparatus 30S without changing the communication condition (No in W4, W5). Subsequently, the management apparatus 30S receives the state information on the air conditioner 10S and manages the air conditioner 10S on the basis of the received state information (W6).

On the other hand, if the intermediate processing apparatus 60S determines that each of the states is beyond the setting range, the intermediate processing apparatus 60S generates new candidate communication conditions (Yes in W4, V7). Specifically, the candidate communication condition generating unit 64I of the intermediate processing apparatus 60S changes the setting of any of or an arbitrary combination of the number of items of air conditioner information, the data length of the air conditioner information, and the communication interval of the air conditioner information, and generates the changed setting as new candidate communication conditions. Subsequently, the communication condition adjusting unit 64K of the intermediate processing apparatus 60S decides on one communication condition from among the new candidate communication conditions (W8). At this time, the intermediate processing apparatus 60S may output the details of the new candidate communication conditions to the intermediate processing apparatus 60S and the control apparatus 20S and may decide on a communication condition after receiving a response. Subsequently, the intermediate processing apparatus 60S updates the setting of the communication condition on the basis of the decision.

Also, the intermediate processing apparatus 60S transmits information about the adjusted communication condition to the management apparatus 30S. When receiving the information about the adjusted communication condition from the intermediate processing apparatus 60S, the management apparatus 30S updates the setting of the communication condition stored in the management apparatus 30S (W9). Accordingly, the communication between the intermediate processing apparatus 60S and the management apparatus 30S is performed under the adjusted communication condition.

Subsequently, the intermediate processing apparatus 60S transmits state information to the management apparatus 30S under the adjusted communication condition (W5).

The intermediate processing apparatus 60S transmits the information about the adjusted communication condition to the control apparatus 20S as necessary. When receiving the information about the adjusted communication condition from the intermediate processing apparatus 60S, the control apparatus 20S updates the setting of the communication condition stored in the control apparatus 20S (W10). Accordingly, the communication between the control apparatus 20S and the intermediate processing apparatus 60S is performed under the adjusted communication condition.

(9) Characteristics 9-1

As described above, the air conditioner management system 1S according to the present embodiment includes the control apparatuses 20S, the intermediate processing apparatus 60S (information processing apparatus), and the management apparatus 30S. Each control apparatus 20S and the intermediate processing apparatus 60S obtain air conditioner information (equipment information) about the air conditioner 10S (equipment). The management apparatus 30S communicates air conditioner information between the control apparatus 20S and the intermediate processing apparatus 60S under a predetermined communication condition and manages the air conditioner 10S. In the air conditioner management system 1S, either or both of the management apparatus 30S and the intermediate processing apparatus 60S include the candidate communication condition generating unit 34I or 64I that generates one or more candidate communication conditions in accordance with the state of the air conditioner 10S and/or the state of the installation space 5S in which the air conditioner 10S is installed.

Thus, in the air conditioner management system 1S according to the present embodiment, the candidate communication condition generating unit 34I or 64I generates one or more candidate communication conditions in accordance with the state of the air conditioner 10S and/or the state of the installation space 5S in which the air conditioner 10S is installed, and thus the management apparatus 30S and/or the intermediate processing apparatus 60S automatically selects a preferable communication condition, or the manager of the management apparatus 30S and/or the manager of the intermediate processing apparatus 60S manually selects a preferable communication condition. In this way, in the air conditioner management system 1S according to the present embodiment, a preferable communication condition is selected, and thus the air conditioner 10S can be appropriately managed with a reduced communication load.

9-2

In the air conditioner management system 1S according to the present embodiment, either or both of the management apparatus 30S and the intermediate processing apparatus 60S include the communication condition adjusting unit 34K or 64K that decides on one communication condition from among candidate communication conditions generated by the candidate communication condition generating unit 34I or 64I and adjusts the condition of communication between the intermediate processing apparatus 60S and the management apparatus 30S.

Thus, in the air conditioner management system 1S according to the present embodiment, the communication condition adjusting unit 34K or 64K optimizes the communication condition in accordance with the state of the air conditioner 10S and/or the state of the installation space 5S in which the air conditioner 10S is installed, and thus the air conditioner 10S can be appropriately managed with a reduced communication load.

9-3

In the air conditioner management system 1S according to the present embodiment, air conditioner information (equipment information) includes state information indicating the state of the air conditioner 10S (equipment) and instruction information for changing the state of the air conditioner 10S (equipment). Thus, regarding the state information, the amount of communication can be reduced in a time slot in which the air conditioner 10S is not operating. On the other hand, regarding instruction information, the amount of communication can be maintained even in a time slot in which the air conditioner 10S is not operating.

9-4

In the air conditioner management system 1S according to the present embodiment, the state of the installation space 5S is determined by any of or an arbitrary combination of the type of the installation space 5S, the installation position of the air conditioner 10S (equipment) in the installation space 5S, the state of a constituent of the installation space 5S, and the time slot in which communication is performed.

Thus, in the air conditioner management system 1S, the air conditioners 10S are managed while being classified in a detailed manner in accordance with a combination of these pieces of information, and thus the communication condition of the entire system can be optimized.

Specifically, as a result of classifying the air conditioner 10S according to "the type of the installation space 5S", the communication condition of air conditioner information can be adjusted for each room, such as a president's room, a reception room, or a server room. The adjustment can be performed in the following manner, for example, the communication frequency is increased when the type of the installation space 5S is "reception room", or the communication frequency is decreased when the type of the installation space 5S is "corridor". In addition, as a result of classifying the air conditioner 10S according to "the installation position of the air conditioner in the installation space 5S", different communication conditions can be set in accordance with whether the installation position is a perimeter zone or an interior zone. In addition, as a result of classifying the air conditioner 10S according to "the state of a constituent of the installation space 5S", different communication conditions can be set in accordance with the opening/closing state of a door, the opening/closing state of a window, the illuminance level of a lighting device, and so forth. The state of a constituent of the installation space 5S is specified on the basis of the measurement values of various sensors attached to the air conditioner 10S or an external sensor. In addition, as a result of classifying the air conditioner 10 according to "time slot", the communication condition can be adjusted for each of time slots to which one day is divided in units of 30 minutes.

9-5

The air conditioner management system 1S according to the present embodiment includes the control apparatus 20S and the intermediate processing apparatus 60S. The control apparatus 20S is disposed in the air conditioner 10S. The intermediate processing apparatus 60S is connected to the control apparatus 20S and the management apparatus 30S.

With this configuration, the intermediate processing apparatus 60S serves as an intermediary between the control apparatus 20S and the management apparatus 30S on the network, and thus the degree of freedom in system design can be increased. For example, the load of the entire system of the management apparatus 30S can be equalized by moving a part of the function of the management apparatus 30S to the intermediate processing apparatus 60S.

9-6

In the air conditioner management system 1S according to the present embodiment, the air conditioner 10S includes the outdoor unit 11S and the one or plurality of indoor units 12Sa and 12Sb connected to the outdoor unit 11S. The candidate communication condition generating unit 34I or 64I generates candidate communication conditions on the basis of information on a person who is present in the installation space of the indoor unit 11Sa.

In the air conditioner management system 1S having the above-described configuration, a communication condition can be changed to a communication condition that is able to optimize the total amount of communication. For example, the above-described configuration enables adjustment in which the communication frequency is increased when the number of people in the installation space 5S is large whereas the communication frequency is decreased when the number of people in the installation space 5S is small.

9-7

In the air conditioner management system 1S according to the present embodiment, the air conditioner 10S includes the outdoor unit 11S and the one or plurality of indoor units 12Sa and 12Sb connected to the outdoor unit 11S. The candidate communication condition generating unit 34I or 64I generates candidate communication conditions on the basis of information on an object disposed in the installation space of the indoor unit 11Sa.

In the air conditioner management system 1S having the above-described configuration, a communication condition can be changed to a communication condition that is able to optimize the total amount of communication. For example, the above-described configuration enables adjustment in which the communication frequency is increased when an object disposed in the installation space 5S is fresh food and the level of rottenness increases, whereas the communication frequency is decreased when the level of rottenness decreases.

9-8

In the air conditioner management system 1S according to the present embodiment, air conditioner information (equipment information) includes a plurality of items. The candidate communication condition generating unit 34I or 64I generates, as a candidate communication condition, a communication condition determined by any of or an arbitrary combination of the number of items of air conditioner information (equipment information), the data length of the air conditioner information (equipment information and the communication interval of the air conditioner information (equipment information).

In the air conditioner management system 1S having the above-described configuration, a communication condition can be changed to optimize the total amount of communication. As a supplement, many of pieces of state information on the air conditioner 10S change by a small amount. Thus, the above-described configuration enables adjustment in which such state information is communicated at a low frequency and the instruction information for changing the state of the air conditioner 10S is communicated at a high frequency.

9-9

In the air conditioner management system 1S according to the present embodiment, the candidate communication condition generating unit 34I or 64I has a function of generating a candidate communication condition in association with the amount of communication and a communication path.

Thus, in the air conditioner management system 1S according to the present embodiment having the above-described configuration, a communication condition that optimizes the amount of communication and the communication path can be selected.

Specifically, the communication condition adjusting unit 34K or 64K changes a communication path to an optimum communication path in accordance with a change in the amount of communication caused by the adjustment of the communication condition. For example, the communication condition adjusting unit 34K or 64K changes a communication scheme to a communication scheme of long-range wireless communication including at least any of the third-generation mobile communication system (3G), the fourth-generation mobile communication system (4G), the fifth-generation mobile communication system (5G), and Low Power Wide Area (LPWA), in accordance with a change in the amount of communication caused by the adjustment of the communication condition. When different pay-per-use settings are applied to these long-range wireless communication schemes, the communication condition adjusting unit 34K or 64K selects a communication path available at the lowest communication charges. However, the selection of a communication path can be changed by the management apparatus 30S and/or the manager of the intermediate processing apparatus 60S as needed.

9-10

In the air conditioner management system 1S according to the present embodiment, the candidate communication condition generating unit 34I or 64I has a function of extracting, as a candidate communication condition, a communication path available at low communication charges from among communication paths satisfying a predetermined quality standard. Accordingly, the communication charges can be reduced with the quality standard satisfied, and thus the introduction of the air conditioner management system 1S can be promoted.

As a supplement, it may be difficult to install a LAN cable depending on the installation place of the air conditioner 10S, or it may actually be impossible to install a LAN cable due to very high cost. In such a case, the introduction of a long-range wireless communication system that can be installed independently of the facility infrastructure in the installation place may be desired. Meanwhile, in the long-range wireless communication system, a pay-per-use scheme is adopted in many cases. Thus, in the case of introducing the long-range wireless communication system, it is desired to introduce the air conditioner management system 1S capable of reducing communication charges while satisfying the quality standard. Specifically, it is desired to introduce, as the long-range wireless communication system, the third-generation mobile communication system (3G), the fourth-generation mobile communication system (4G), the fifth-generation mobile communication system (5G), Low Power Wide Area (LPWA), or the like. In these communication schemes, different pay-per-use settings are applied. Even when such a long-range wireless communication system is introduced, in the air conditioner management system 1S according to the present embodiment including the candidate communication condition generating unit 34I or 64I, a communication path available at low communication charges is extracted from among the communication paths satisfying the predetermined quality standard. Thus, in the air conditioner management system 1S according to the present embodiment, the communication charges for the communication between the intermediate processing apparatus 60S and/or the control apparatus 20S and the management apparatus 30S can be reduced with the quality standard being satisfied.

(10) Modified Embodiment (10-1) Modified Embodiment 2A

In the air conditioner management system 1S according to the second embodiment, air conditioner information includes a plurality of items. Regarding an item communicated among the control apparatus 20S, the management apparatus 30S, and the intermediate processing apparatus 60S, an arbitrary item can be selected. Specifically, an item of air conditioner information can be added, changed, or deleted by directly inputting an instruction to the management apparatus 30S or by inputting instruction information to the intermediate processing apparatus 60S or the management apparatus 30S via the authorized-user terminal 40S through the network.

(10-2) Modified Embodiment 2B

In the air conditioner management system 1S according to the second embodiment, the management apparatus 30S is able to update the program of the intermediate processing apparatus 60S and/or the control apparatus 20S through the network as needed. Accordingly, an item of air conditioner information communicated among the control apparatus 20S, the management apparatus 30S, and the intermediate processing apparatus 60S can be added, changed, or deleted appropriately.

(10-3) Modified Embodiment 2C

In the air conditioner management system 1S according to the second embodiment, the intermediate processing apparatus 60S is able to update the program of the control apparatus 20S through the network NW as needed. Accordingly, an item of air conditioner information communicated among the control apparatus 20S, the management apparatus 30S, and the intermediate processing apparatus 60S can be added, changed, or deleted appropriately.

(10-4) Modified Embodiment 2D

In the air conditioner management system 1S according to the second embodiment, the air conditioner 10S can be controlled on the basis of an operation schedule. The air conditioner management system 1S may have a setback function.

(10-5) Modified Embodiment 2E

Figure 21:
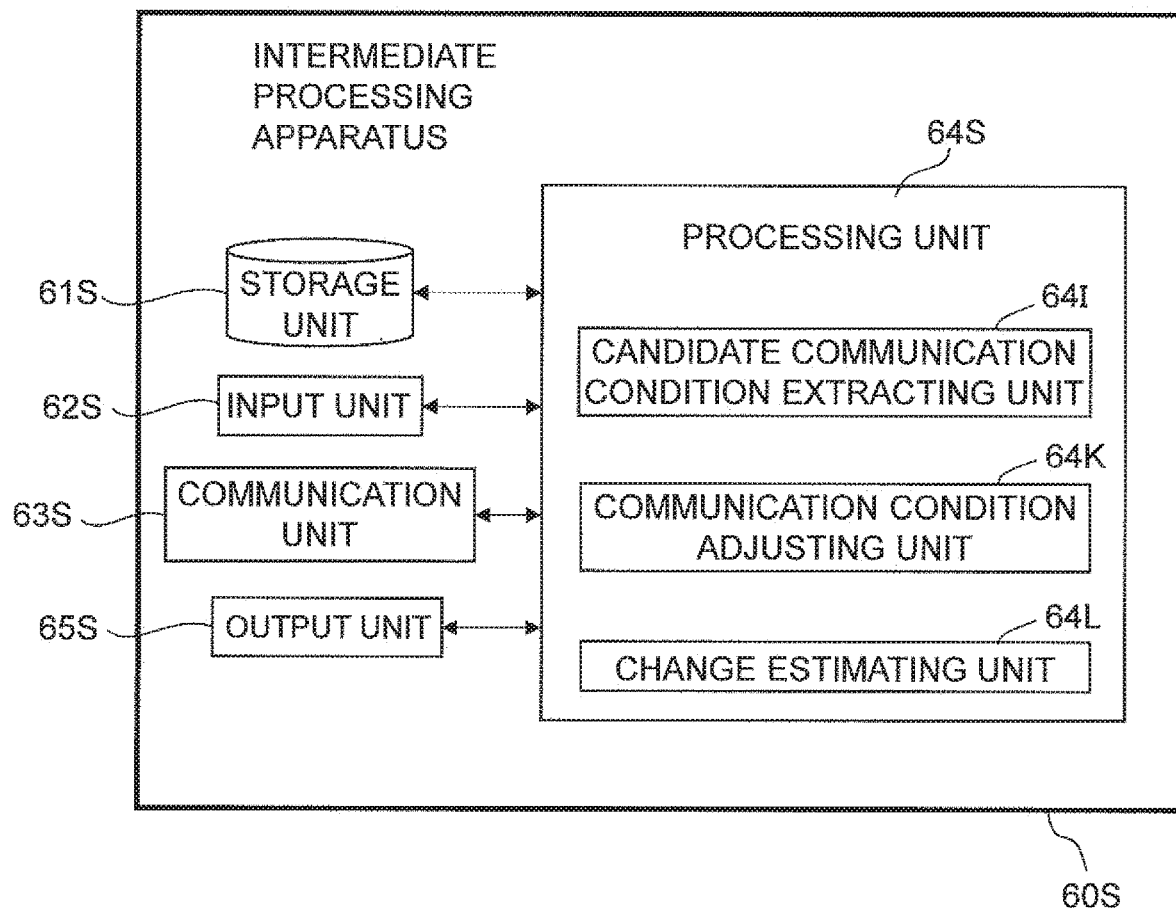
FIG. 21 is a schematic diagram illustrating the configuration of the intermediate processing apparatus 60S according to modification example 2E.

In the air conditioner management system 1S according to the second embodiment, simulation may be performed as needed regarding predetermined state information by the intermediate processing apparatus 60S, and the state information may be transmitted to the management apparatus 30S only when an abnormality occurs. Specifically, in the intermediate processing apparatus 60S according to modification example 2E, the processing unit 64S has a function of a change estimating unit 64L as illustrated in FIG. 21. The change estimating unit 64L simulates a change in the state information obtained from the control apparatus 20 regarding the predetermined state information as needed. If the simulated change in the state information regarding the predetermined state information is beyond a predetermined range, the change estimating unit 64L determines that an abnormality has occurred. Only when the change estimating unit 64L determines that an abnormality has occurred, the communication condition adjusting unit 64K transmits the state information to the management apparatus 30S. On the other hand, when the change estimating unit 64L determines that an abnormality has not occurred, the communication condition adjusting unit 64K does not transmit the state information to the management apparatus 30S.

In other words, the air conditioner management system 1S according to modification example 2E compares the predetermined state information obtained from the air conditioner 10S with the state information simulated by the change estimating unit 64L, and suppresses communication of the state information when the predetermined state information does not have an abnormality. Accordingly, the amount of communication between the intermediate processing apparatus 60S and the management apparatus 30S can be reduced.

(10-6) Modified Embodiment 2F

In the description given above, the air conditioner management system 1S includes the intermediate processing apparatus 60S, but the air conditioner management system 1S according to the second embodiment is not limited to such a configuration. The air conditioner management system 1S according to the second embodiment need not necessarily include the intermediate processing apparatus 60S, and the management apparatus 30S and the control apparatus 20S may communicate with each other.

Third Embodiment

In an equipment management system according to a third embodiment of the present invention, the target to be managed is equipment other than the air conditioners 10 and 10S. That is, the configurations of the air conditioner management systems 1 and 1S according to the above embodiments are applied to other equipment. In this case, in the description of the air conditioner management systems 1 and 1S according to the above embodiments, each of the air conditioners 10 and 10S is replaced with equipment, and air conditioner information is replaced with equipment information. Thus, the equipment management system according to the present embodiment includes a control apparatus mounted in the equipment and a management apparatus that collects equipment information from the control apparatus and manages the equipment information.

In the equipment management system according to the present embodiment, the condition of communication between an information processing apparatus and a management apparatus is adjusted in accordance with the state of the equipment and/or the state of the installation space of the equipment, and thus it is possible to provide the equipment management system capable of appropriately managing equipment while reducing a communication load.

In addition, the equipment management system according to the present embodiment has a configuration and function similar to those described about the air conditioner management systems 1 and 1S according to the above embodiments and is able to produce similar effects.

Supplementary Note

The present invention is not limited to the above embodiments. The present invention can be embodied by modifying the components without deviating from its gist in the implementation phase. In addition, the present invention can form various inventions by appropriately combining a plurality of components disclosed in the above embodiments. For example, some of all the components described in the embodiments may be deleted. Furthermore, components of different embodiments may be appropriately combined.

What is claimed is:

1. An equipment management system comprising:
    an information processing apparatus configured to obtain equipment information about an air conditioner; and
    a management apparatus configured to
        communicate the equipment information with the information processing apparatus under a predetermined communication condition, and
        manage the air conditioner,
    either or both of the management apparatus and the information processing apparatus including a candidate communication condition generating unit configured to generate one or more candidate communication conditions in accordance with both of
        a state of the air conditioner including at least one of
            control information for an electrically powered valve, a motor, or an actuator of the air conditioner,
            a detected value obtained from a sensor installed in the air conditioner and used to control operation of the air conditioner, and
            an abnormality code indicating an abnormality in operation of the air conditioner, and
        a state of an installation space in which the air conditioner is installed.

2. The equipment management system according to claim 1, wherein
    either or both of the management apparatus and the information processing apparatus include a communication condition adjusting unit
        configured to decide on one communication condition from the one or more candidate communication conditions generated by the candidate communication condition generating unit and
        configured to adjust a condition of communication between the information processing apparatus and the management apparatus.

3. The equipment management system according to claim 1, wherein
    the equipment information includes state information indicating the state of the air conditioner and instruction information to change the state of the air conditioner.

4. The equipment management system according to claim 1, wherein
the state of the installation space is determined by any of or an arbitrary combination of
a type of the installation space including information of a use of the installation space,
an installation position of the air conditioner in the installation space,
a state of a constituent constituting the installation space, and
a time slot in which communication is performed.

5. The equipment management system according to claim 1, wherein
the information processing apparatus includes
a control apparatus disposed in the air conditioner, and
an intermediate processing apparatus connected to the control apparatus and the management apparatus.

6. The equipment management system according to claim 5, wherein
the intermediate processing apparatus includes
a state information obtaining unit configured to obtain state information indicating the state of the air conditioner and
a change estimating unit configured to simulate a change in the state information, and
the equipment management system is
configured to compare the state information obtained by the state information obtaining unit with state information simulated by the change estimating unit, and
configured to suppress communication of the state information when the state information does not have an abnormality.

7. The equipment management system according to claim 1, wherein
the air conditioner includes an outdoor unit and one or a plurality of indoor units connected to the outdoor unit, and
the candidate communication condition generating unit is configured to generate the one or more candidate communication conditions based on information on a person who is present in an installation space of the one or plurality of indoor units.

8. The equipment management system according to claim 1, wherein
the air conditioner includes an outdoor unit and one or plurality of indoor units connected to the outdoor unit, and
the candidate communication condition generating unit is configured to generate the one or more candidate communication conditions based on information on an object that is disposed in an installation space of the one or plurality of indoor units.

9. The equipment management system according to claim 1, wherein
the equipment information includes a plurality of items, and
the candidate communication condition generating unit is configured to generate, as the one or more candidate communication conditions,
a communication condition determined by any of or an arbitrary combination of a number of items of the equipment information,
a data length of the equipment information, and
a communication interval of the equipment information.

10. The equipment management system according to claim 1, wherein
the candidate communication condition generating unit is configured to generate the one or more candidate communication conditions in association with an amount of communication and a communication path.

11. The equipment management system according to claim 1, wherein
the candidate communication condition generating unit is configured to extract, as the one or more candidate communication conditions, a communication path based on communication charges,
the communication path is extracted from a plurality of communication paths satisfying a predetermined quality standard.

12. A communication condition adjustment method usable in an equipment management system including an information processing apparatus that obtains equipment information about an air conditioner and a management apparatus that communicates the equipment information with the information processing apparatus under a predetermined communication condition and manages the air conditioner, the communication condition adjustment method comprising:
adjusting the communication condition in accordance with both of
a change in a state of the air conditioner, the state of the air conditioner including at least one of
control information for an electrically powered valve, a motor, or an actuator of the air conditioner,
a detected value obtained from a sensor installed in the air conditioner and used to control operation of the air conditioner, and
an abnormality code indicating an abnormality in operation of the air conditioner, and
a state of an installation space of the air conditioner.

13. The communication condition adjustment method according to claim 12, wherein
a communication path is changed in accordance with a change in an amount of communication caused by adjustment of the communication condition.

14. The communication condition adjustment method according to claim 12, wherein
in accordance with a change in an amount of communication caused by adjustment of the communication condition, a communication scheme is changed to a communication scheme of long-range wireless communication including at least any of
a third-generation mobile communication system,
a fourth-generation mobile communication system, and
a fifth-generation mobile communication system.

15. The communication condition adjustment method according to claim 14, wherein
in the long-range wireless communication, different pay-per-use settings are applied to individual communication schemes.

16. An air conditioner management system comprising:
a control apparatus configured to communicate air conditioner information about an air conditioner at a predetermined communication interval; and
a management apparatus configured to
communicate the air conditioner information with the control apparatus, store presence information about a presence of a person in an installation space of the air conditioner, and manage the air conditioner, the management apparatus or the control apparatus including a communication interval setting unit configured to change a setting of the communication interval based on the stored presence information, the communication interval being set such that a number of communications decreases as a detected occupancy decreases, and the communication interval being a first non-zero communication interval when a first non-zero occupancy is detected and a second non-zero communication interval when a second non-zero occupancy is detected, the first and second non-zero communication intervals being different, the stored presence information being changed when a difference between the stored presence information and a detected presence information occurring at or more than a predetermined frequency.

* * * * *